United States Patent [19]
Harima et al.

[11] Patent Number: 4,677,680
[45] Date of Patent: Jun. 30, 1987

[54] METHOD AND DEVICE FOR INSPECTING IMAGE

[75] Inventors: Hiroshi Harima, Yokosuka; Hiroshi Nishida, Tokyo, both of Japan

[73] Assignee: Dai Nippon Insatsu Kabushiki Kaisha, Tokyo, Japan

[21] Appl. No.: 527,947

[22] Filed: Aug. 30, 1983

[30] Foreign Application Priority Data

| Aug. 31, 1982 | [JP] | Japan | 57-151118 |
| Oct. 21, 1982 | [JP] | Japan | 57-185063 |
| Nov. 29, 1982 | [JP] | Japan | 57-208850 |
| Jun. 16, 1983 | [JP] | Japan | 58-108224 |

[51] Int. Cl.$^4$ .............................................. G06K 9/62
[52] U.S. Cl. ......................................... 382/1; 356/394; 382/34; 382/45
[58] Field of Search .................... 382/45, 44, 1, 34; 356/443, 444, 232, 237, 388, 389, 392, 394, 398; 250/559; 358/106

[56] References Cited

U.S. PATENT DOCUMENTS

| 4,136,332 | 1/1979 | Kadota et al. | 382/45 |
| 4,179,685 | 12/1979 | O'Maley | 382/45 |
| 4,197,584 | 4/1980 | Blazek | 356/394 |
| 4,459,021 | 7/1984 | Blazek | 356/394 |

Primary Examiner—Leo H. Boudreau
Attorney, Agent, or Firm—Koda and Androlia

[57] ABSTRACT

Disclosed is a method and device for inspecting defects of the image on a print in the form of a web which is transported in its longitudinal direction. Data each representative of the density of each picture element of a reference print are stored in a memory in accordance with predetermined addresses. Thereafter, data each representative of the density of each picture element of a sample print are derived and compared in density one picture element by one picture element with the reference data read out from the memory, whereby whether or not the sample print has any defect is determined. In this case, because of a web transport system or because of printing sheet itself, data are deviated with respect to each other so that this deviation must be corrected or compensated for. The present invention provides a method and device for inspecting the printing image while correcting or compensating for the deviation between the two data.

6 Claims, 38 Drawing Figures

POSITIONS OF PICTURE ELEMENTS

SHIFTED POSITIONS OF REFERENCE
ROW DATA (PICTURE ELEMENT)

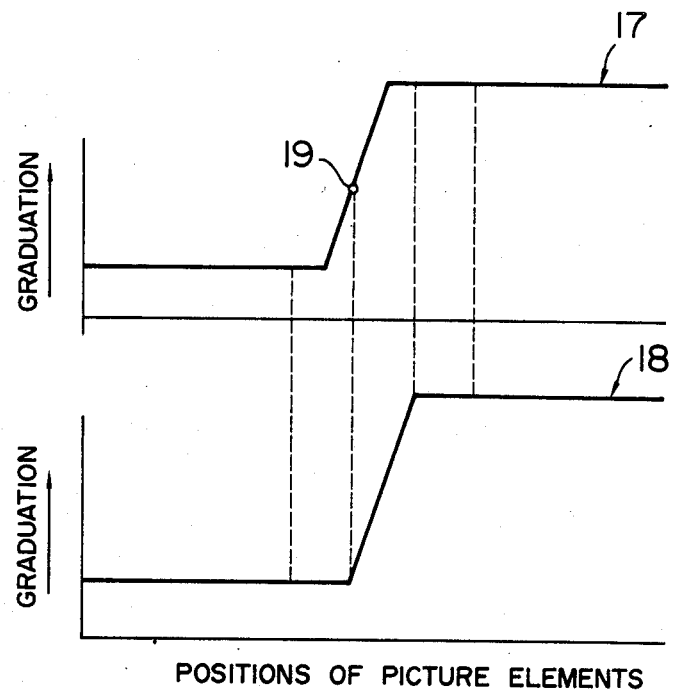

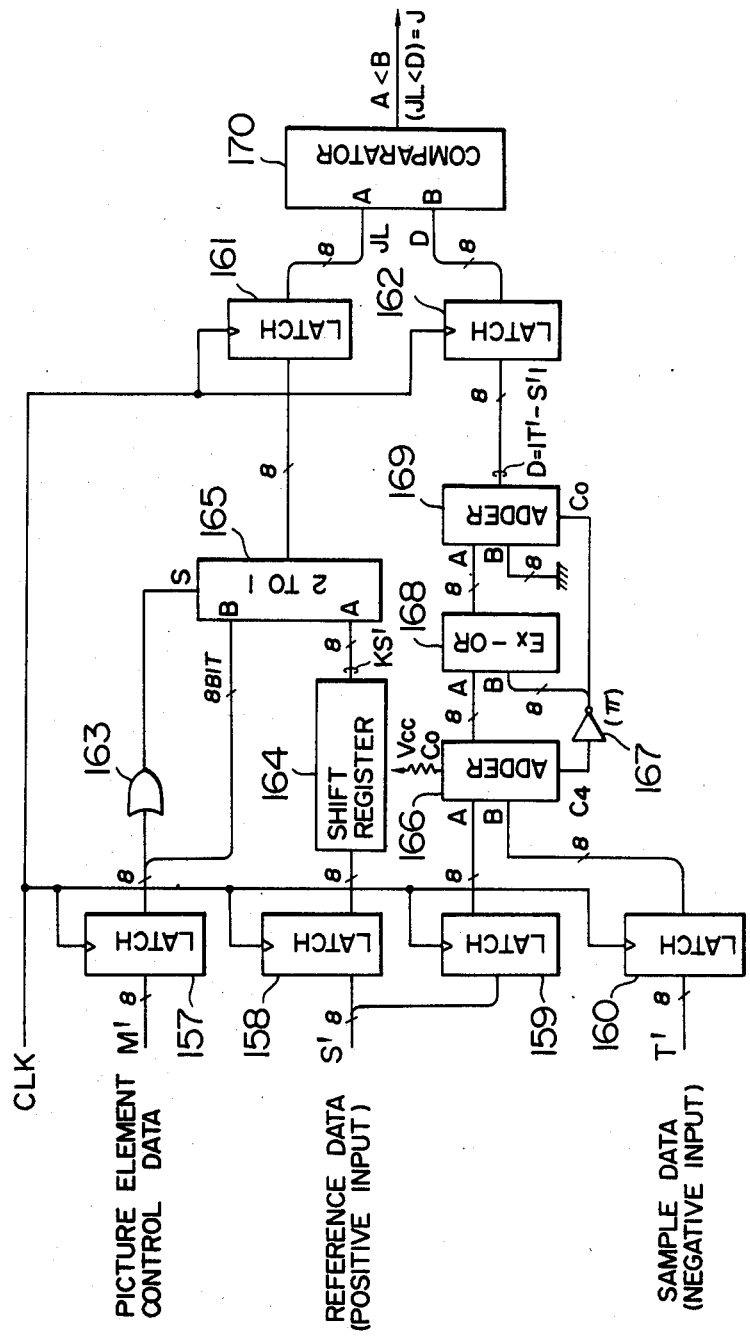

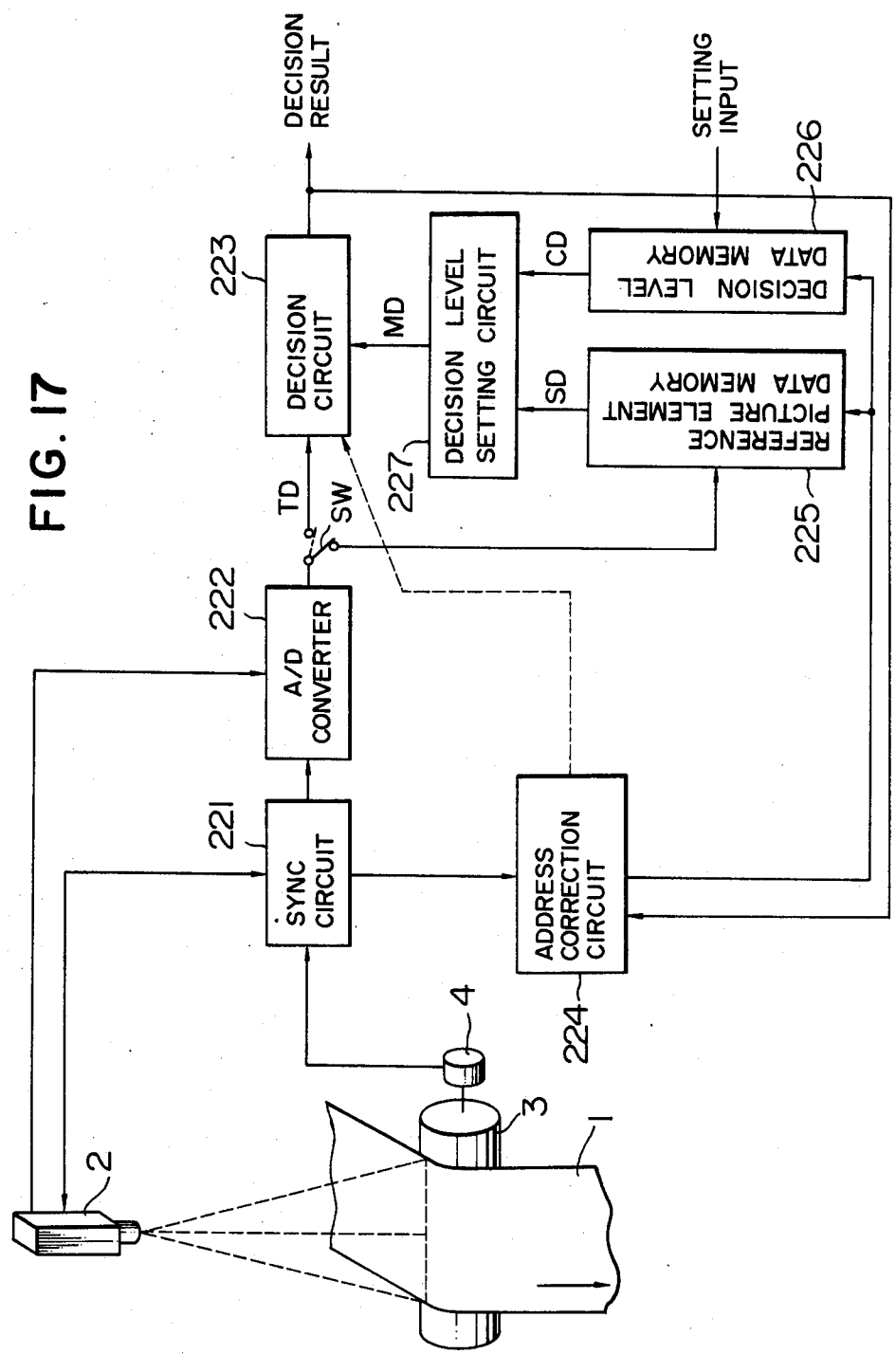

NUMBER OF DEFECTS DETECTED BY DECISION ELEMENTS

| DECISION RESULT | FN1 | FN2 | FN3 | FN4 | FN5 | FN6 | FN7 |
|---|---|---|---|---|---|---|---|
| J1 | 0 | 1 | X | X | X | X | X |
| J2 | X | X | 0 | 1 | X | X | X |
| J3 | X | X | X | X | 0 | 1 | X |
| J4 | 0 | 0 | 1 | 1 | X | X | X |
| J5 | X | X | X | X | 0 | 0 | 1 |
| J6 | 0 | 0 | 0 | 0 | 1 | 1 | 1 |

X : EITHER 1 OR 0

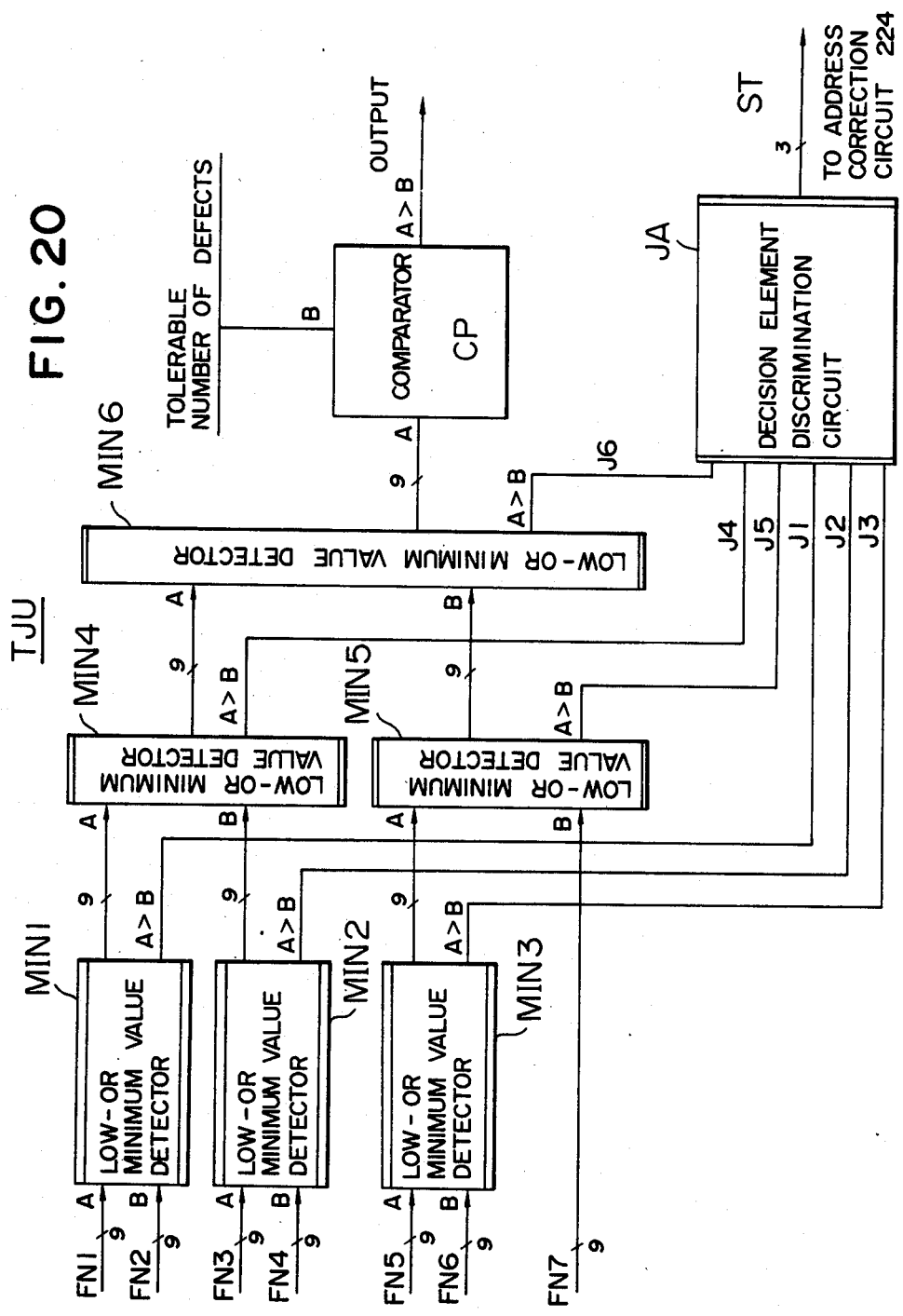

FIG. 26
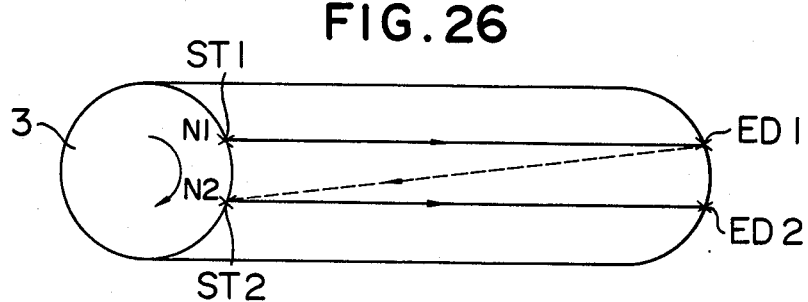
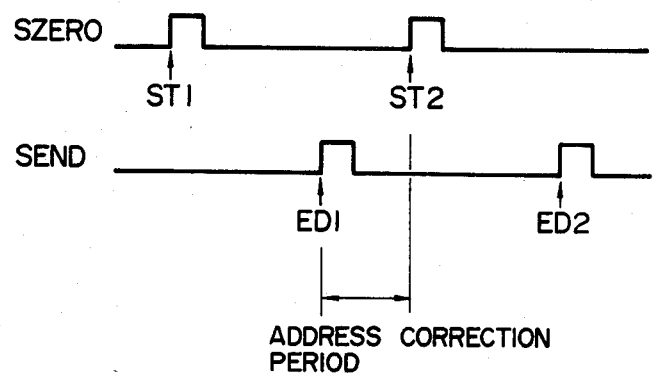
FIG. 27
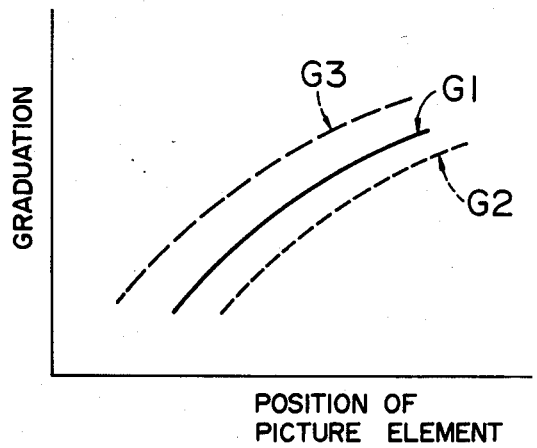

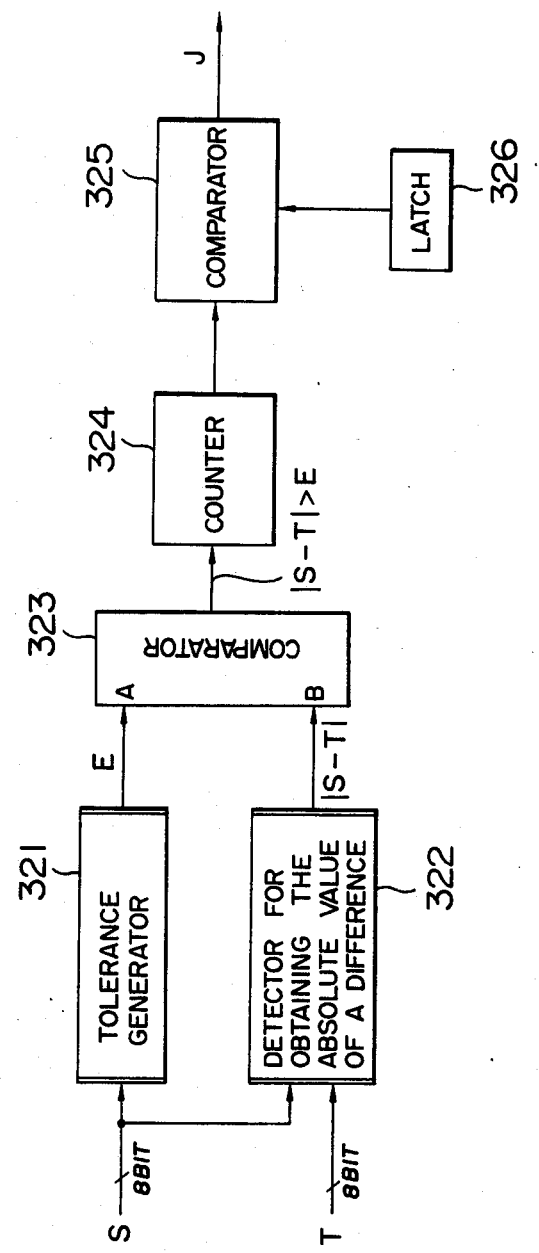

METHOD AND DEVICE FOR INSPECTING IMAGE

BACKGROUND OF THE INVENTION

The present invention relates to a method and device for inspecting a printed image.

According to a prior art printed image inspection device, a line sensor camera 2 scans a printed image 1 in the widthwise direction as shown in FIG. 1 so that image information is derived. The angle of rotation of a transfer cylinder 3 is detected by a rotary encoder 4 attached thereto so that in response to the output from the encoder 4, the scanning by the camera 2 is synchronized so that a sample image 5 (See FIG. 2) is divided into a plurality of picture elements in the form of a matrix.

A reference image 6 (See FIG. 2) is also divided into a plurality of picture elements in the form of a matrix. The density of each picture element of the sample image 5 is compared with the density of each picture element of the reference image 6, whereby whether the sample image 5 has defective picture elements or not is detected.

However, if the sample image 5 is deviated widthwise with respect to the reference image 6 as shown in FIG. 3, the gradation 7 of three picture elements (marked by 0) of the sample image 5 are different from the gradation 8 of the corresponding picture elements of the sample image 5. As a result, even though the sample image 5 has no defective picture element, it is detected as unacceptable or as having defective picture elements.

One of the methods to overcome this problem is to provide a large degree of gradation difference tolerance; that is, the tolerance in gradation between the reference and sample images 6 and 5, but this method is not satisfactory in practice because the defects of the sample image cannot be detected with a satisfactorily high degree of accuracy.

Another method to overcome this problem is to correct the misalignment or misregistration between the reference and sample images and various methods of this type have been proposed. For instance, one method is disclosed in the Japanese Patent Application No. 146,355/1981 filed by the same applicant. According to this method, the widthwise position of a sample printed image is detected and stored in a memory. The widthwise position of the sample printed image is then compared with the widthwise position of a reference image stored in a reference-position memory and if the difference between their widthwise positions is in excess of a predetermined distance, sample image data is stored in the reference/position memory.

According to this method, however, means for detecting the deviation in widthwise direction of a sample printed image with respect to a reference image as well as means for correcting the widthwise deviation of the sample printed image are needed. As a result, hardware becomes complex in construction and expensive in cost.

Another method is disclosed in the Japanese Patent Publication No. 45,948/1980. According to this method, a picture element of a sample printed image is compared with a few picture elements adjacent to the corresponding picture element of a reference image. However, this method is still unsatisfactory in practice because a desired degree of inspection accuracy cannot be attained.

SUMMARY OF THE INVENTION

The present invention was made to overcome the above and other problems encountered in the prior art methods and devices for inspecting printed images and has for its object to provide a method and device for inspecting printed images, whereby even when a printed image is deviated in any direction, it may be inspected with a high degree of accuracy. Another object of the present invention is to provide a device for inspecting printed images which is inexpensive to manufacture yet highly reliable and dependable in operation.

According to the present invention, to the above and other ends, there is provided a method and device for inspecting printed images, in which when widthwise image gradation data of a sample image (to be referred to as "the sample row datum or data" in this specification) is compared with the corresponding widthwise image gradation data of a reference image (to be referred to as "the reference row datum or data" in this specification) so as to detect the defective picture elements of the sample image, each sample row datum is compared with a plurality of reference row data which are shifted within a predetermined tolerance range so that the sample row data are compared with the reference row data which are most similar in phase with the sample row data.

BRIEF DESCRIPTION OF THE DRAWINGS

FIGS. 4a, 4b and 4c are views used to explain the underlying principle of an image inspection method in accordance with the present invention and a method for inspecting the edges of an image in accordance with the present invention;

FIG. 16 is a block diagram of a decision circuit as shown in FIG. 12;

FIG. 17 is a block diagram of a third embodiment of the present invention;

FIG. 20 is a block diagram of a detector for obtaining the absolute difference used in the decision element as shown in FIG. 19;

FIG. 26 is a view used to explain the mode of correcting an image signal address;

FIG. 27 is a view used to explain the mode of the shift when reference picture element data is read out in the third embodiment as shown in FIG. 17;

FIG. 34 is a block diagram of a decision element in the decision circuit as shown in FIG. 33.

DETAILED DESCRIPTION OF THE INVENTION

The embodiments of the present invention will be described in detail with reference to FIGS. 4 through 35.

Figure 4A:
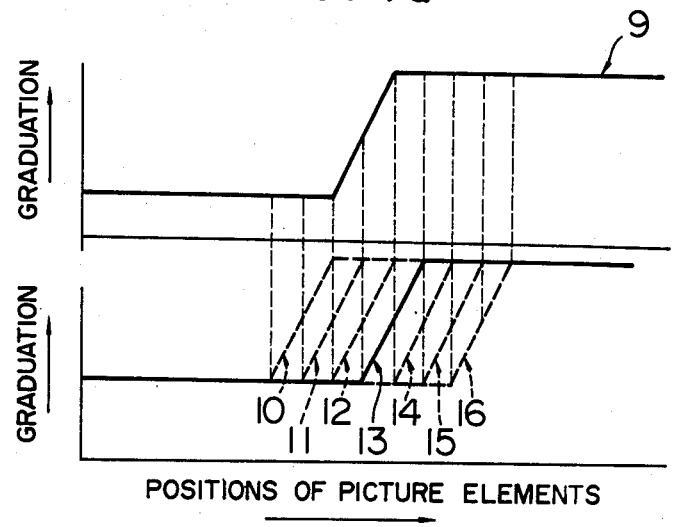
Figure 4B:
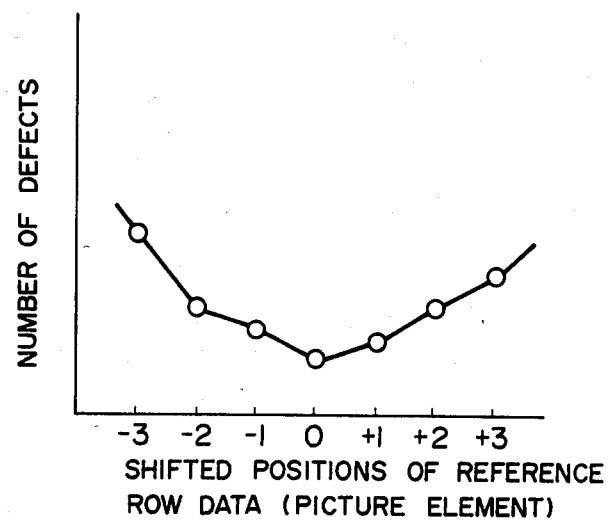

In FIGS. 4a, 4b and 4c are shown a sample row data and a reference row data. FIG. 4a shows the fundamental relationship between the sample row data and the reference row data; FIG. 4b shows the relationship between the deviation in position between the sample and reference row data; and FIG. 4c shows the relationship between the sample and reference row data at the edge of an image or other special portion thereof.

As shown in FIG. 4a, one sample row datum 9 is compared with a plurality of reference row data 10-16 which are obtained by shifting to the right and left the reference row datum 13 by a distance corresponding to one picture element based upon a deviation in position expected to result from the tolerance of a transport system. Of the reference row data 10-16, the datum 12 which is most similar in phase to the sample row datum 9 is compared in density with the sample row datum 9, whereby a defect can be detected.

Therefore it follows that even when the sample row datum 9 is deviated in the widthwise direction, the sample and reference row data can be compared so that defects can be detected with a high degree of accuracy. A method for choosing the reference row datum from the reference row data which is most similar in phase to the sample row datum is as follows.

When each of the reference row data is compared with the sample row datum during one horizontal scanning period, the reference row datum which is most similar in phase to the sample row datum finds the least number of defects as shown in FIG. 4b. That is, the reference row datum which finds the least number of defects during one horizontal scanning period is one which is most similar in phase to the sample row datum. FIG. 4b shows an image with a relatively low degree of contrast and if an image has a relatively high degree of contrast, the curve would become steeper.

As shown in FIG. 4c, a sample row datum 17 is compared with a reference row datum 18 which is most similar in phase to the sample row datum 17. A large gradation tolerance is given. Therefore, the defects at an edge at which the gradation difference is high can be suitably detected. That is, the reference row datum 18 is most similar in phase to the sample row datum 17 so that the phase difference between them is one half of a picture element. Therefore, a tolerance for a picture element at an edge is the gradation difference between the reference and sample row data which are spaced apart from each other by one half of a picture element.

Various methods for determining a tolerance for each picture element have been proposed (See Japanese Patent Application No. 179,599/1981). Alternatively, the picture elements along an edge may be masked so that no detection may be made.

Figure 5:
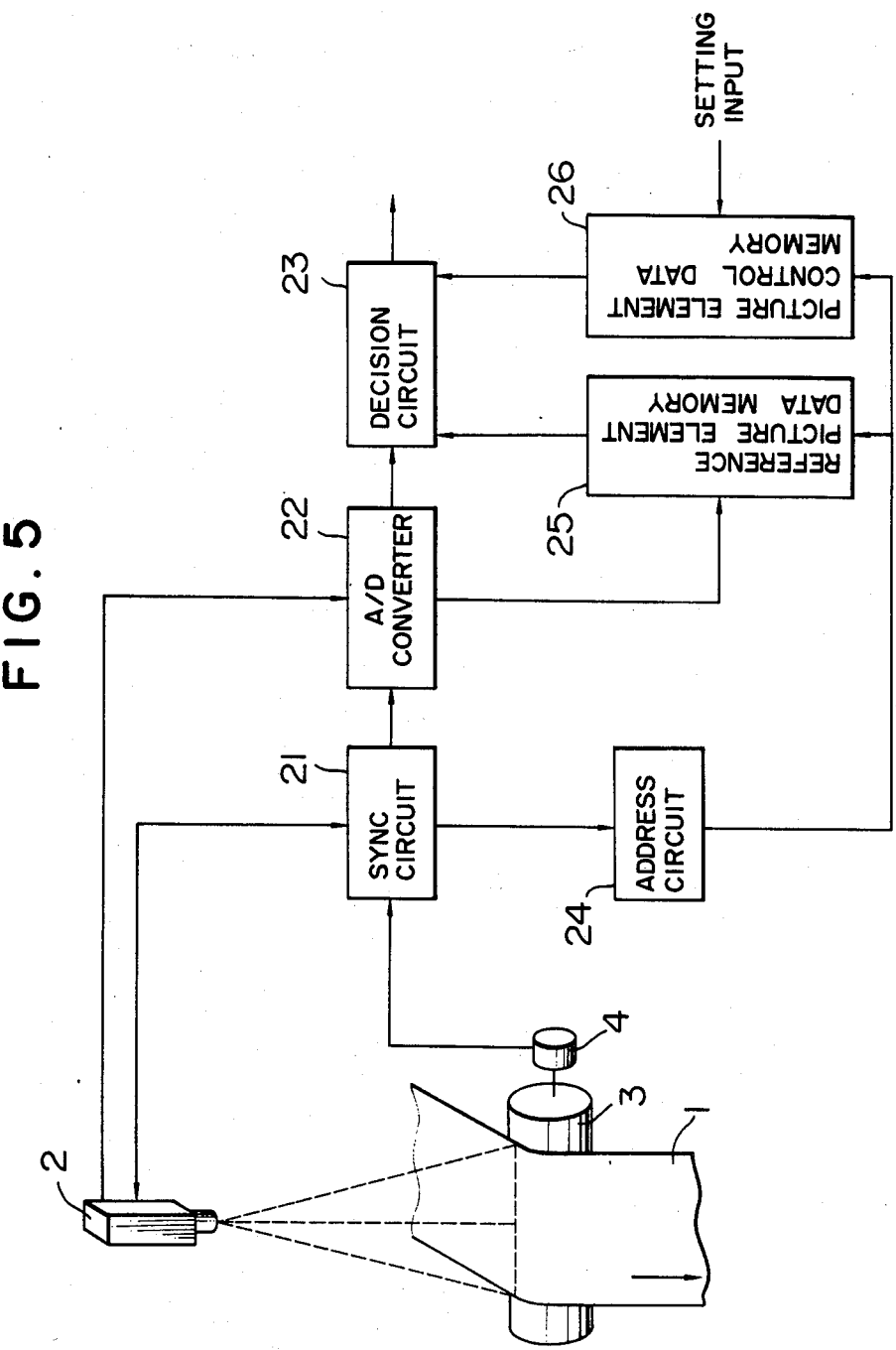
FIG. 5 is a block diagram of a first embodiment of the present invention.

In FIG. 5 is shown a first embodiment of the present invention based upon the underlying principle described with reference to FIG. 4. A camera 2 scans a print 1, whereby image data can be derived. A rotary encoder 4 detects the angle of rotation of a transport cylinder 3 and applies its output to a sync circuit 21. The output from the sync circuit 21 is applied to the camera 2, an A/D converter 22 and an address circuit 24 so that the scanning by the camera 2 can be synchronized; and A/D conversion of the image data derived from the camera 2 can be synchronized; and the addressing to a reference picture element data memory 25 and a picture element control data memory 26 can be carried out.

Therefore, the writing of the reference row data into the reference picture element data memory 25 and the readout of the data from the reference picture element data memory 25 and the picture element control data memory 26 in order to activate a decision circuit 23 so as to detect the sample row data can be synchronized. The picture element data memory 26 stores a tolerance for each picture element. When the decision circuit 23 compares the sample row data with the reference row data, it takes into consideration a tolerance supplied from the picture element control data memory 26.

Figure 1:
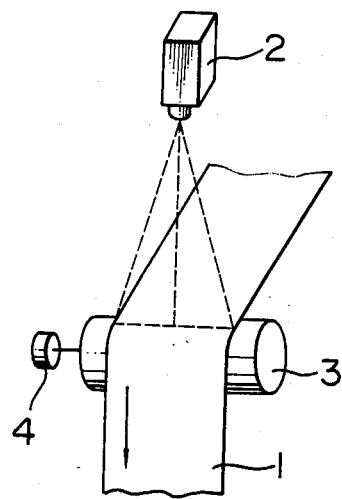
FIG. 1 shows an image information detection unit of an image inspection device.
Figure 2:
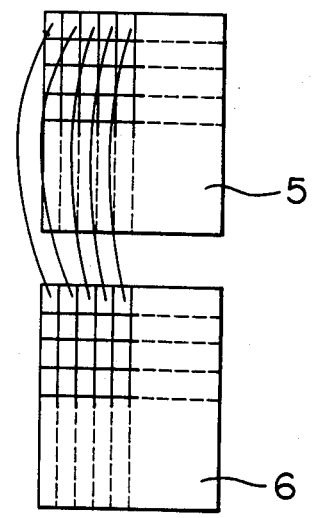
FIG. 2 is a view used to explain the method for recording sample image data and reference image data for the inspection of an image.
Figure 3:
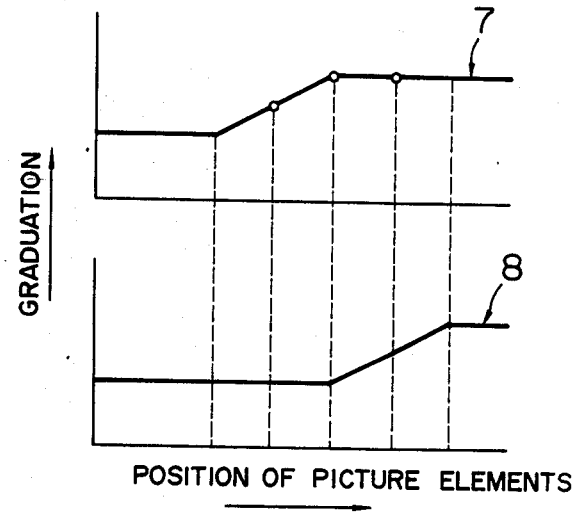
FIG. 3 is a view used to explain the misalignment or misregistration between a reference image and a sample image due to the widthwise deviation of the sample image while it is being transported.
Figure 6:
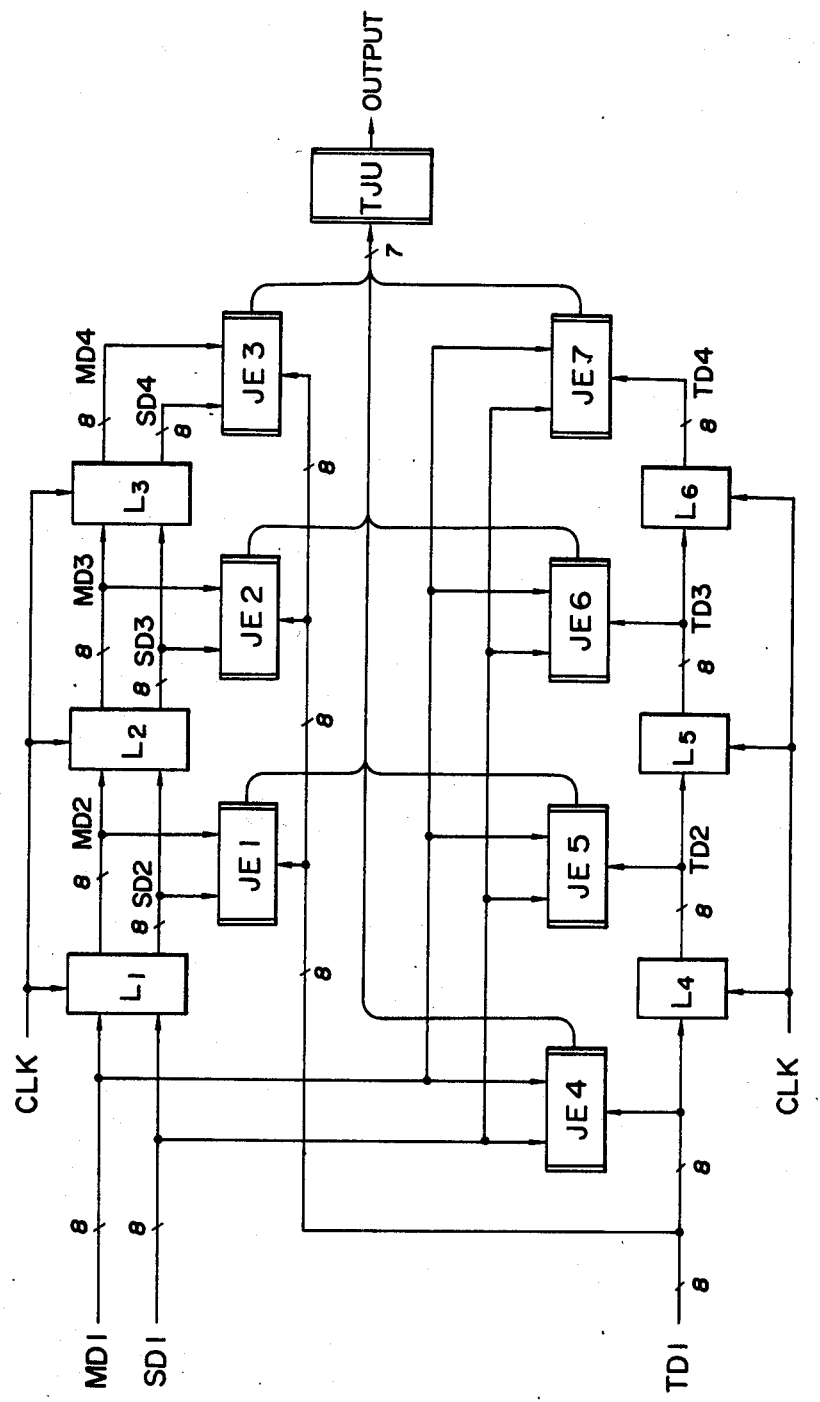
FIG. 6 is a block diagram of a decision circuit shown in FIG. 5.

In FIG. 6 is shown in detail the construction of the decision circuit 23 comprising, in combination, a shift circuit consisting of latches $L_1-L_3$ for shifting by one picture element a sample row datum SD and a picture element control datum MD, another shift circuit consisting of latches $L_4-L_6$ for shifting by one picture element a sample row datum TD, and two decision element groups each consisting of decision elements $JE_1-JE_3$ and $JE_4-JE_7$. In response to the clock CLK, which is also applied to the camera (See FIG. 1), applied to the latches, each shift circuit carries out the shift operation. To this end, one clock CLK is generated for each picture element.

For instance, the sample row datum TD1 is sequentially shifted in synchronism with the scanning by the camera 2 by the latches $L_4$, $L_5$ and $L_6$ so that TD2, TD3 and TD4 may be derived. In like manner, in synchronism with the scanning by the camera 2, the reference row datum SD; and the picture element control datum MD1 are sequentially shifted by the latches $L_1$, $L_2$ and $L_3$ so that MD2, MD3, MD4, SD2, SD3 and SD4 are derived.

The sample row datum TD1 is applied to the decision elements JE1, JE2, JE3 and JE4 and compared with the reference row datum and the picture element control datum. That is, the decision element JE4 compares the sample row datum TD1 with the reference row datum SD1 and the picture element control datum MD1. The decision element JE1 compares TD1 with SD2 and MD2; the decision element JE2 compares TD1 with SD3 and MD3; and the decision element JE3 compares TD1 with SD4 and MD4. Therefore, the decision is made when the reference row datum and the picture element control datum are delayed with respect to the sample row datum.

On the other hand, the decision elements JE5, JE6 and JE7 make decisions when the sample row data are delayed with respect to the reference row data and the picture element control data.

Thus each of the decision elements JE1-JE7 compares the sample row datum 9 with each of the reference row data 10-16 (See FIG. 4a). The outputs from the decision elements JE1-JE7 are applied to an overall decision circuit TJU which selects the least output and compares it with a predetermined threshold value. That is, depending upon whether the least output is higher or lower than the threshold value, the printed image is rejected or accepted.

Figure 7:
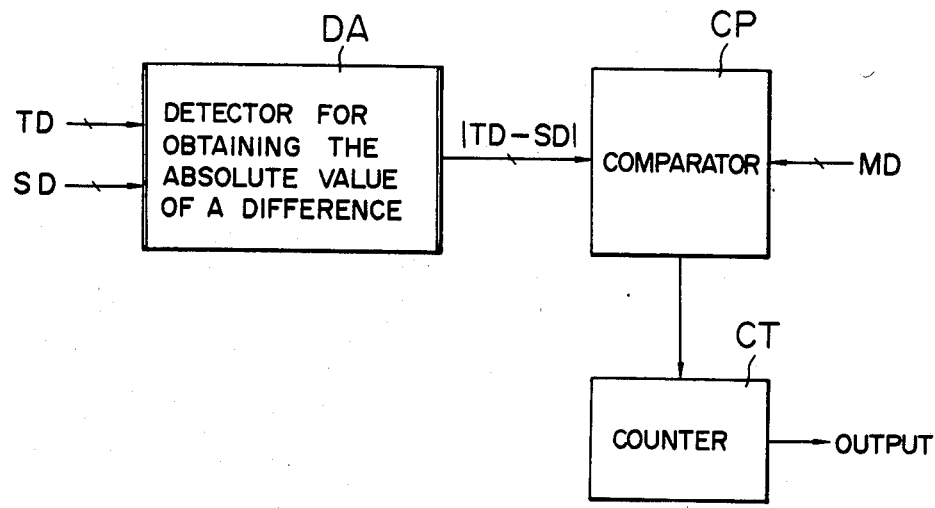
FIG. 7 is a block diagram of a decision element in the decision circuit.

In FIG. 7 is shown in detail the construction of each of decision elements JE comprising a detector DA for detecting the absolute value of a difference, a comparator CP and a counter CT. The absolute value $|TD-SD|$ between the sample row datum TD and the reference row datum SD is derived from the detector DA and the absolute value $|TD-SD|$ is compared with a picture element control data MD, which is a tolerance for $|TD-SD|$, in the comparator CP the output of which is applied to the counter CT, whereby the number of picture elements in which $|TD-SD|>MD$ is counted.

Figure 8:
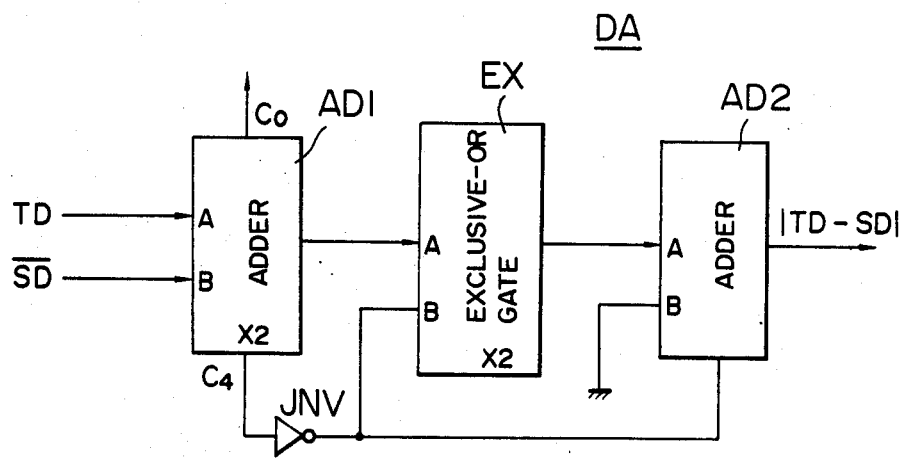
FIG. 8 is a block diagram of a detector for obtaining the absolute value of a difference used in the decision element.

In FIG. 8 is shown in detail the construction of the detector DA shown in FIG. 7. The detector DA comprises two adders AD1 and AD2, an exclusive-or circuit EX and an inverter INV. Inputs TD and $\overline{SD}$ are applied to the first adder AD1 and the output $\overline{TD-SD}$ is derived from the second adder AD2. The detector DA of this type is well known in the art so that no further detailed explanation shall be made in this specification.

Figure 9:
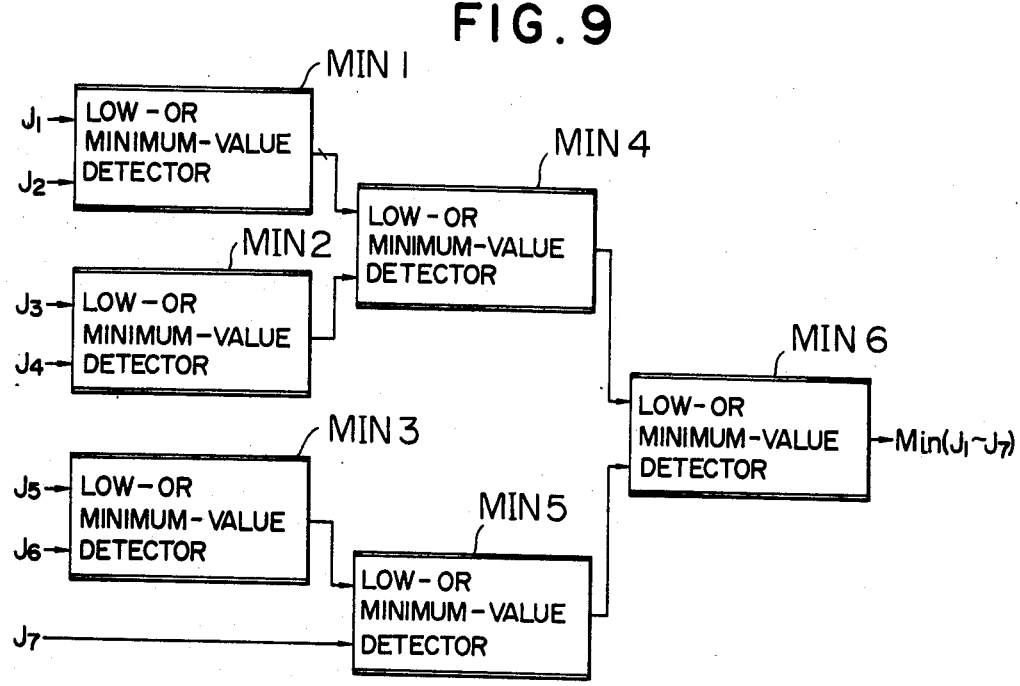
FIG. 9 is a block diagram of an overall decision circuit in the decision circuit as shown in FIG. 6.

In FIG. 9 is shown in detail the construction of the overall decision circuit TJU comprising six low- or minimum-value detectors MIN1-MIN6 so that the least or minimum output is detected from the outputs J1-J7 from the decision elements JE1-JE7 (See FIG. 6).

Figure 10:
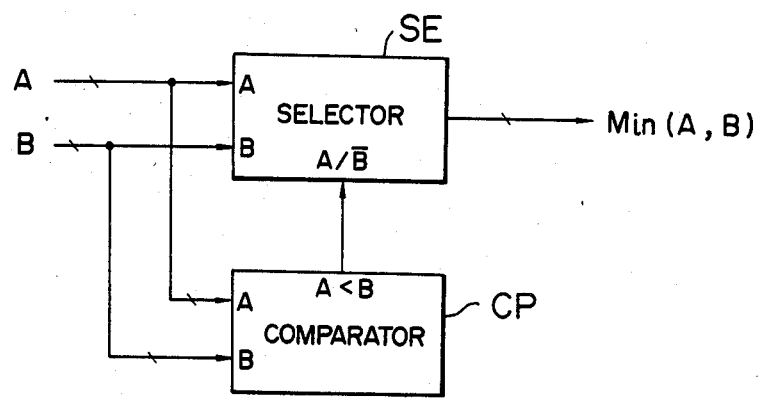
FIG. 10 is a block diagram of a low- or minimum-value detector used in the overall decision circuit as shown in FIG. 9.

In FIG. 10 is shown in detail the low- or minimum-value detector MIN comprising a selector SE and a comparator CP. The detector MIN is adapted to detect whether the input A is lower than the input B or the input B is lower than the input A. Therefore, in the overall decision circuit TJU, the first detector MIN1 detects whether the input J1 is lower than the input J2, the second detector MIN2 detects whether the input J3 is lower than the input J4 or the input J4 is lower than the input J3 and the third detector MIN3 detects whether the input J5 is lower than the input J6 or the input J6 is lower than J5. The fourth detector MIN4 detects whether the output from the detector MIN1 is lower than the output from the detector MIN2 or vice versa and the fifth detector MIN5 detects whether the output from the third detector MIN3 is lower than the input J7 or vice versa. Finally the sixth detector MIN6 detects whether the output from the fourth detector MIN4 is lower than the output from the fifth detector MIN5 or vice versa. Thus, the least or minimum output among the inputs J1 through J7 is derived from the sixth detector MIN6.

As described above, even when the printed image is deviated in position, whether the printed image is acceptable or not can be correctly determined at high speed and low cost. The reference row data are compared with the sample row data so that the inspection can be carried out with a higher degree of accuracy as compared with the case in which the whole sample print is compared with the whole reference print.

Figure 11:
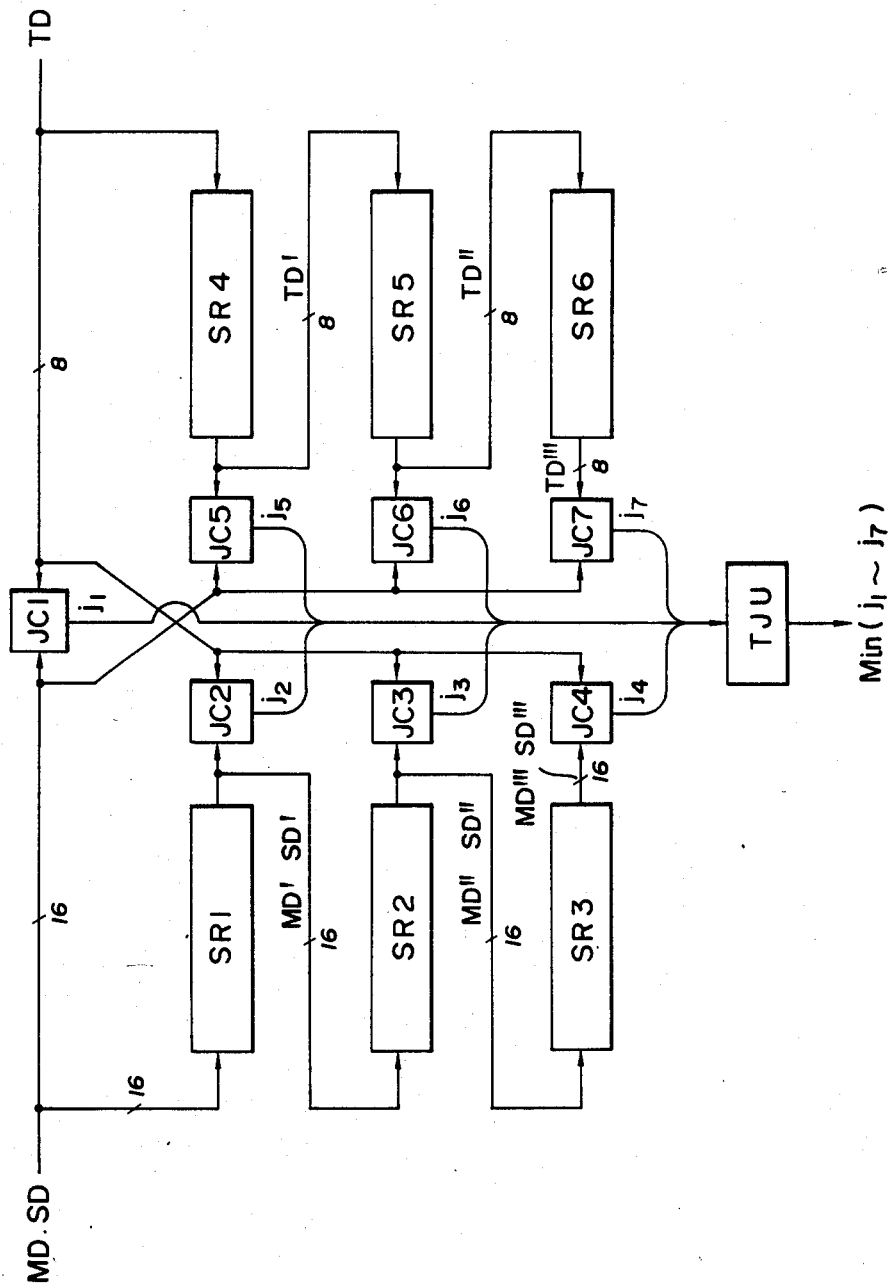
FIG. 11 is a block diagram of a circuit for compensating for the deviation in the direction in which an image is transported.

In FIG. 11 is shown a circuit diagram which is capable of compensating for the deviation in position in the direction of the transportation of the print. As is the case of the decision circuit as shown in FIG. 6, the circuit comprises decision circuits JC1-JC7, shift registers SR1-SR6 and an overall decision circuit TJU. Each of the shift registers SR has the number of bits equal to the number of bits of the sensor array of the camera 2 (See FIG. 1). The shift registers SR1-SR6 are similar in function to the latches L1-L6 as shown in FIG. 6. That is, they delay the reference row datum SD, the picture element control datum MD and the sample row datum TD by one picture element and the outputs from these registers SR1-SR6 are applied to the decision circuits JC1-JC7 and the outputs j1-j7 from JC1-JC7 are applied to the overall decision circuit TJU so that the least or minimum output is selected.

Figure 12:
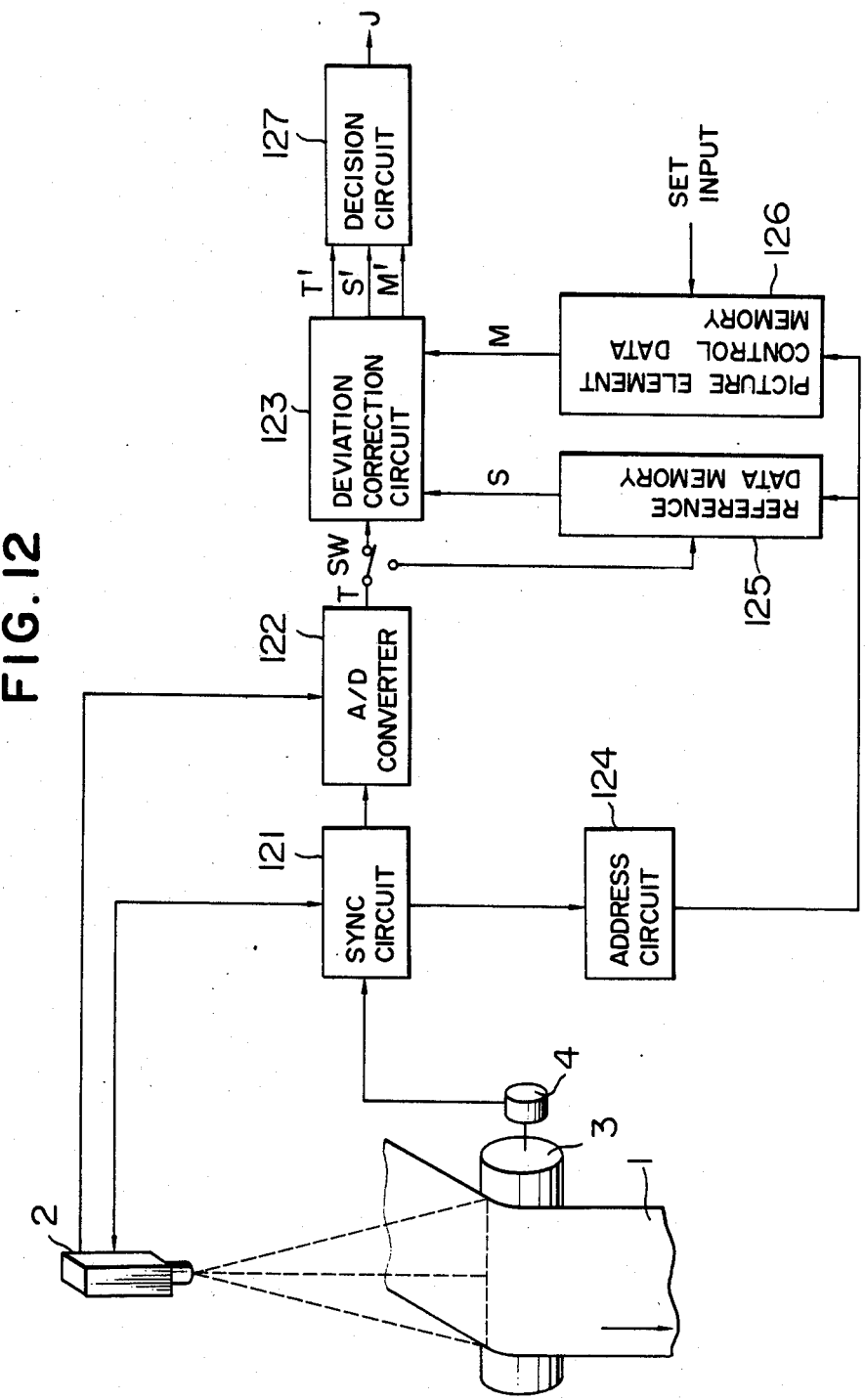
FIG. 12 shows in block diagram a second embodiment of the present invention.

In FIG. 12 is shown another embodiment of the present invention. The camera 2 scans the printed image 1 so that printed image data is derived. The rotary encoder 4 detects the angle of rotation of the transport cylinder 3 and the output from the rotary encoder 4 is applied to a sync circuit 121. The output from the sync circuit 121 is applied to the camera 2, an A/D converter 122 and an address circuit 124 so that the scanning by the camera 2 can be synchronized; the A/D convertions of the image data derived from the camera 2 can be synchronized; and the addressing of a reference data memory 125 and a picture element control data memory 126 is accomplished. A switch SW is so actuated that a reference datum S is read out from the reference data memory 125 for each sample datum T and a picture element control datum M is read out from the picture element control memory 126. The picture element control datum M represents a tolerance for each picture element.

The reference datum S derived from the memory 125, the picture element control datum M derived from the memory 126 and the sample datum T derived from the A/D converter 122 are applied to a positional deviation correction circuit 123 so that S', M' and T' are derived and applied to a decision circuit 127. In response to the corrected data S', T' and M', the decision circuit 127 detects the defects of the image on the sample print.

Figure 13:
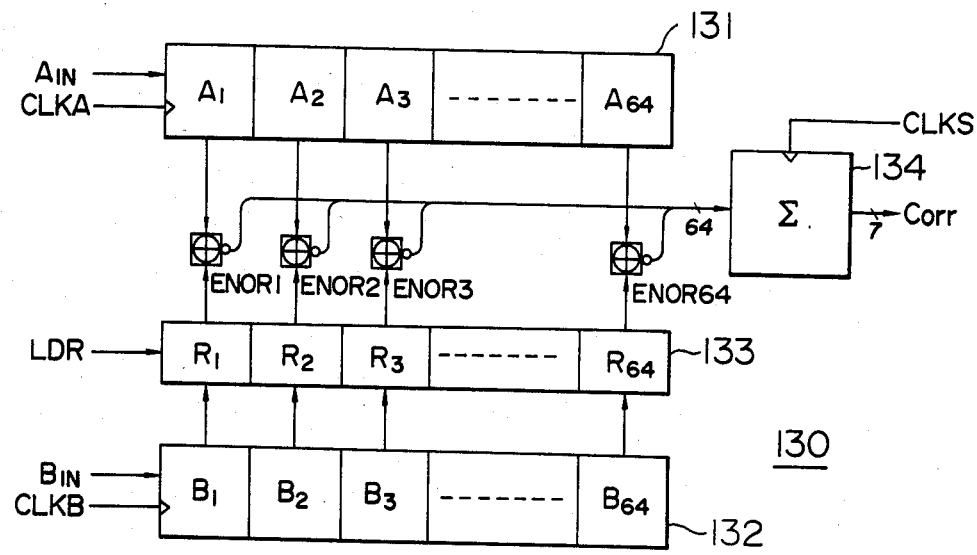
FIG. 13 is a block diagram of a correlator used in the second embodiment.
Figure 14:
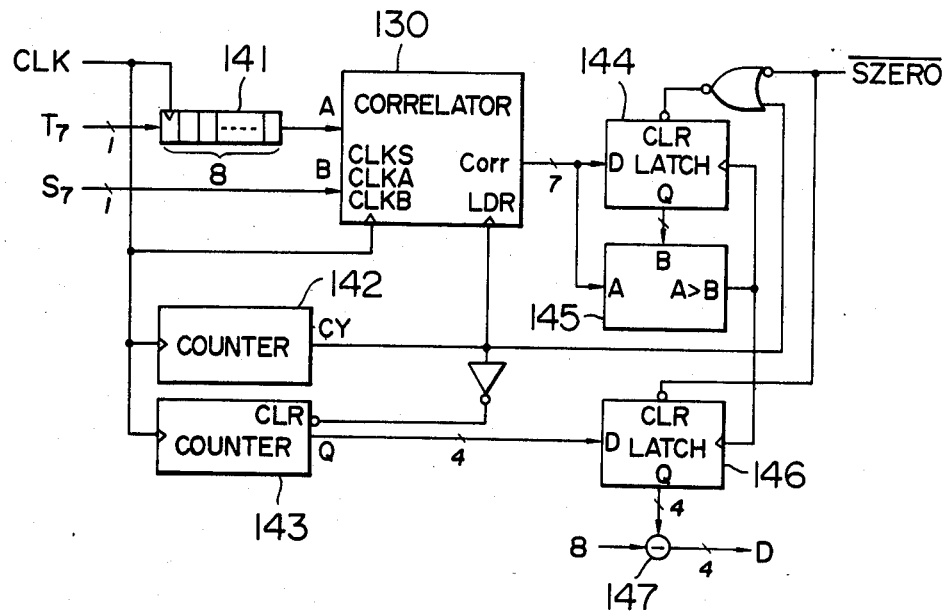
FIG. 14 is a block diagram of a detector which is adapted to detect a deviation and which incorporates the correlator as shown in FIG. 13.

In FIG. 13 is shown in detail the construction of a correlator which constitutes the positional deviation correction circuit 123 (FIG. 14). In response to the output from the circuit 123, a correction circuit (FIG. 15) corrects a positional deviation.

The correlator 130 may comprise, for example, TDC 1023J, the product of TRW Corp. The correlator 130 comprises two 64-bit shift registers 131 and 132, one 64-bit latch 133, exclusive-nor gates $ENOR_1$-$ENOR_{64}$ and an adder 134.

One-bit serial input $B_{IN}$ (64 bits) and clock CLKB for effecting the serial input are applied to the shift register 132 and each bit output is applied to the latch 133 ($R_1$-$R_{64}$) which in turn is latched in response to the latch signal LDR. One-bit serial input $A_{IN}$ (64 bits) and clock CLKA for effecting the serial input are applied to the shift register 131. Each bit output is applied to one input terminal of each of exclusive-or gates $ENOR_1$-$ENOR_{64}$. The bit output from the latch 133 ($R_1$-$R_{64}$) is applied to the other input of the exclusive-or gate. The outputs of exclusive-or gates $ENOR_1$-$ENOR_{64}$ are applied to the adder 134 which in turn, in response to a clock CLKS, delivers a seven-bit output Corr; that is, the number of outputs derived from the exclusive-or gates.

After, in response to the clock CLKB, 64-bit reference data $B_1$-$B_{64}$ are applied to the shift register B, in response to the latch signal LDR, the contents of the shift register 132 are held in the latch 133 ($R_1$-$R_{64}$). Thereafter, in response to the outputs from the shift registers 131 and the latch 133, the correlated value is calculated. During the calculation, the next reference data are applied to the shift register 132.

In response to the clock CLKA, the sample data $A_1$-$A_{64}$ are applied to the shift register 131 and to the exclusive-NOR gates $ENOR_1$-$ENOR_{64}$ to which are also applied the reference data $R_1$-$R_{64}$ from the latch 133. When An equals Rn, the output from the exclusive-NOR gate $ENOR_n$ is "1", but if An is not equal to Rn, the output is "0". The number of the exclusive-NOR gates which delivers "1" are derived from the adder 134 as the correlated value. Therefore the maximum value of the correlated value is "64".

Whenever the sample data A are shifted, the correlated value varies. That fact that the sample data A are in phase with the reference data R means that the correlated value has a miximum value. It follows therefore that positional deviation can be detected by determining the phase at which the correlated value has a maximum value.

In FIG. 14 is shown in detail the construction of the positional deviation detector which utilizes the correlator 130 as shown in FIG. 13. First the underlying principle of the detector will be described. The detector detects the positional deviation D which ranges between −8 and +7. If D<0, the phase of the sample datum T is advanced; if D=0, the sample data are in phase with the reference data S; and if D>0, the reference data S is advanced. That is, if the sample datum T is advanced by 8 bits, D=−8, but if the sample datum T is delayed by 7 bits, D=+7. The positional deviation range which can be detected can be easily expanded as will be described hereinafter.

In order to compare in phase between the reference datum S and the sample datum T, the correlationship between the time serial 1/φ patterns of $MSBS_7$ and $T_7$ is determined by the correlator 130. Both the reference and sample data S and T have 8 bits and therefore represent from 0 to +255. Therefore if the reference datum S (sample datum T) is in excess of +128, $S_7 = 1$ ($T_7 = 1$), but if the reference datum S (Sample datum T) is less than 128, $S_7 = 0$. That is, the threshold value is 128 and a picture element which has a value in excess of the threshold value is assigned with "1" while a picture element which is less than the threshold value is assigned with "0".

According to this method, if the data S and T are in excess of 128 or less than 128, no correlation between the data S and T can be established so that the deviation in position cannot be detected. However, in practice, an image has various gradations from the dark to the light level so that it will not happen that both the data S and T are in excess of or lower than 128. Therefore, even though a very simple hardware is used, the above described method is very effective.

However, if the above-described method has any problem, the following methods may be used:

(i) The threshold value is not fixed to 128 and is floated depending upon the data S and T. For instance, the average value of the data S and T may be used as a threshold value; and (ii) The data S and T are differentiated so that the edge of an image is obtained. And instead of $S_7$ and $T_7$, the time serial 1/0 patterns S' and T' which correspond to the edge are used to obtain the correlationship between S' and T'.

Next the mode of operation of the circuit as shown in FIG. 14 will be described in more detail hereinafter. It is assumed that the reference datum S and the sample datum T both having the same address be simultaneously applied. In order to detect that sample datum T is advanced, the sample datum $T_7$ is applied to an 8-bit shift register 141 and is delayed in phase by 8 bits. The camera scanning clock CLK may be used to shift the shift register 141.

When a 64-bit time serial 1/0 pattern $S_7$, which is a reference, is applied to the correlator 130, the counter 142 delivers the latch signal LDR for latching the pattern. The latch 144 holds the correlated value Corr. The initial value of the latch 144 is φ when the scanning by the camera 2 is started and is reset in response to the scanning start signal $\overline{S\ ZERO}$ produced by a system. Whenever a high correlated value Corr is delivered from the correlator 130, it is latched in the latch 144 in response to the output from the comparator 145.

The counter 143 counts the camera scanning clock CLK and the count or result (4 bits representative of the numbers from 0-15) is stored in the latch 146. The content in the latch 146 is varied everytime when a high correlated value Corr is delivered in response to the output from the comparator 145 so that the phase when the correlated value has a maximum value is stored in the latch 146. The positional deviation D (−8−+7) can be obtained by subtracting "8" from the maximum correlated value Corr latched in the latch 146 by a subtractor 147. The subtraction of "8" is made in order to correct the delay in the shift register 141 corresponding to 8 clocks CLK counted by the counter 143.

Whenever a 64-bit input; that is, $S_7$ which is the reference datum MSB, is applied to the correlator 130, the counter 143 and the latch 144 are reset so that the positional deviation D representative of the positional difference between the reference datum S and the sample datum T is derived. That is, if the total number of picture elements scanned by the camera is 512, the correction of the positional deviation between the reference datum S and the sample datum T can be carried out for every 8 blocks each consisting of 64 picture elements.

In order to expand the positional deviation D ($-8-+7$), a 16-bit shift register 145 is used and the counter 143 is so modified that it delivers the output consisting of 8 bits. And "16" is subtracted by the subtractor 147. Thus, the positional deviation D ($-16-+15$) can be obtained. In like manner, the range of the positional deviation D which can be detected can be expanded.

Figure 15A:
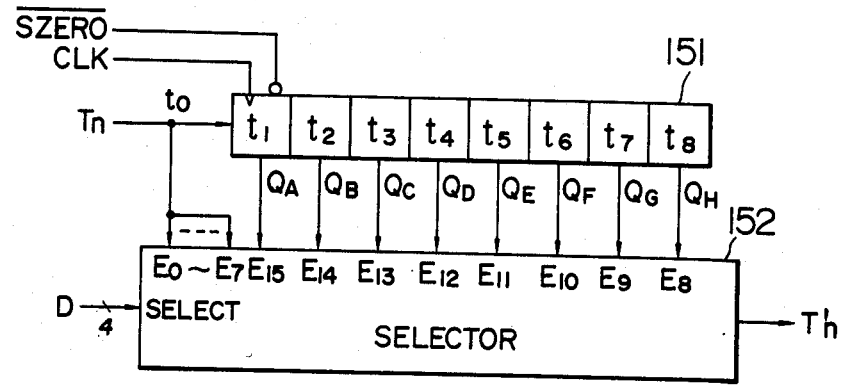
FIG. 15a and FIG. 15b are block diagrams of circuits which coact with the circuit as shown in FIG. 14 so as to compensate for deviation.
Figure 15B:
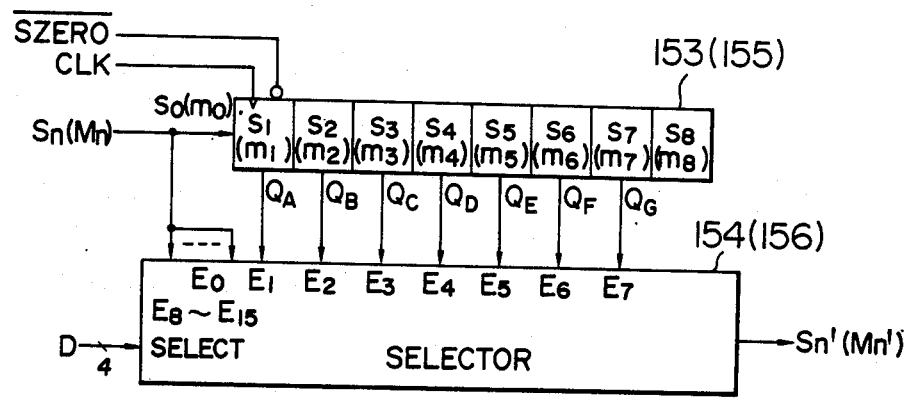

In FIG. 15a and FIG. 15b is shown in detail a positional deviation correction circuit which is adapted to correct a positional deviation in response to the output D from the positional deviation detector as shown in FIG. 14. FIG. 15a shows a circuit which processes the sample datum T while FIG. 15b shows a circuit which processes the reference datum S. Both the circuits are similar in construction. That is, the positional deviation correction $T_n'$ of the n-th bit $T_n$ of the sample datum T can be obtained by an 8-bit shift register 151 and a 16-by-1 selector 152. If eight bits are arranged in parallel, the datum T' resulting from the positional correction of the sample datum T can be derived. When $D \geq 0$, $T' = t_0$ (where $t_0$ represents that there is no shift) and when $D < 0$, $T' = t_1, \ldots,$ and $t_8$ (which represents the shift from one bit to 8 bits).

In like manner, by means of a shift register 153 (155) and a selector 154 (156), $S' = s_0$ and $M' \leq m_0$ if $D = 0$ and $S' = s_1-s_8$ and $M' = m_1-m_8$ if $D > 0$. ($m_1-m_8$ represent the shift from one bit to 8 bits.) In response to the scanning start signal $\overline{S\ ZERO}$ produced when the camera scanning is initiated, the shift registers 151, 153 and 155 are reset to $\phi$.

Thus, in response to the positional deviation D, the reference datum S; the sample datum T; and the picture element control datum M' whose positional deviations are corrected can be derived. The corrected S', T' and M' are applied to the decision circuit 127 (See FIG. 12) so that defects can be detected.

In FIG. 16 is shown one example of the decision circuit 127. 157–162 are 8-bit latches; 163, an OR gate array which is adapted to receive 8 bits; 164, a shift register; 165, a selector; 166 and 169, adders; 167, an inverter; 168, an exclusive OR gate; and 170, a comparator.

Next the mode of operation will be described. It is assumed that printing is started so that the inspection operation is started. Then, the reference datum S', the sample datum T' and the picture element control datum M', whose positional deviations have been corrected, are applied to the latches 157-160.

The positive reference datum S', which is applied to the latch 159, and the negative sample datum T', which is applied to the latch 160, are processed by the adder 166, the inverter 167, the exclusive-OR gate 168 and the adder 169 so that the datum D which represents the absolute value of the difference between the sample datum T' and the reference datum S' is obtained and applied to the latch 162. That is $D = |T' - S'|$ is obtained. The datum D is applied from the latch 162 to one input terminal B of the comparator 170.

The reference datum S' derived from the latch 158 is applied to the shift register 164 in which the reference datum S' is shifted by a predetermined number of bits and is multiplied by a coefficient K (which is less than unity) so that KS' is applied to one input terminal B of the selector 165.

The picture-element control datum M' is applied through the latch 157 to the other input terminal A of the selector 165 and through the OR gate 163 to the selection terminal S of the selector 165. The selector 165 is adapted to deliver the datum applied to the input terminal B when the signal applied to the selection terminal S is at a high level, but when the signal applied to the selection terminal S is at a low level, the datum applied to the input terminal A is delivered as the output.

The comparator 170 compares the datum JL applied to the input terminal A with the datum D applied to the input terminal B and delivers a high-level output J only when the datum applied to the input terminal B is greater than the datum applied to the input terminal A. That is, the datum JL applied to the input terminal A is used as a reference level and the output J is derived in the manner described above.

As described above, even when a printed image is deviated to some extent, whether the image is acceptable or not acceptable can be correctly determined at high speed and at low cost. Since the reference data are compared with the sample data, the inspection with a higher degree of accuracy can be accomplished as compared with the case in which the whole reference and sample images are compared with each other.

In the second embodiment described above, no memory for storing the sample data is provided, but it is to be understood that a sample data memory may be provided. Furthermore, in the case of the detection of the positional deviation, the sample data may be displaced by one picture element in the direction in which the print is transported.

In FIG. 17 is shown a third embodiment of the present invention.

The rotary encoder 4 detects the angle of rotation of the transport cylinder 3 which transports the print 1 and the output from the encoder is applied to a sync circuit 221. The scanning position signal from the camera 2 is also applied to the sync circuit 221 so that a position on the print 1 is detected. In response to the output from the sync circuit 221, an A/D converter 222 converts the analog output from the camera 2 into a digital signal. In response to the output from the sync circuit 221, an address correction circuit 224 addresses the print 1. The most important function of the address correction circuit 224 is to determine an optimum address of the next row in response to the feedback of the output from a decision circuit 223 regarding to the reference row patten which is most similar in phase to the sample row pattern. A digital quantity is detected and the information for each picture element is stored in a reference picture element data memory 225. Thereafter from the next image, the decision circuit 223 compares with sample row data with the shift row data derived from the reference picture element data memory 225 in a real time. In response to the data derived from a decision level data memory 226 and the data from the reference picture element data memory 225, a decision level setting circuit 227 obtains a decision level in a real time and the output from the decision level setting circuit 227 is applied to the decision circuit 223.

The signal (which is indicated by the broken line) which is applied from the address correction circuit 224 to the decision circuit 223 is used to obtain an optimum address of the sample picture element datum derived from the camera 2. In this case, the decision circuit 223 must be provided with a shift register or the like so that the sample picture element data must be shifted one picture element by one picture element.

Figure 18:
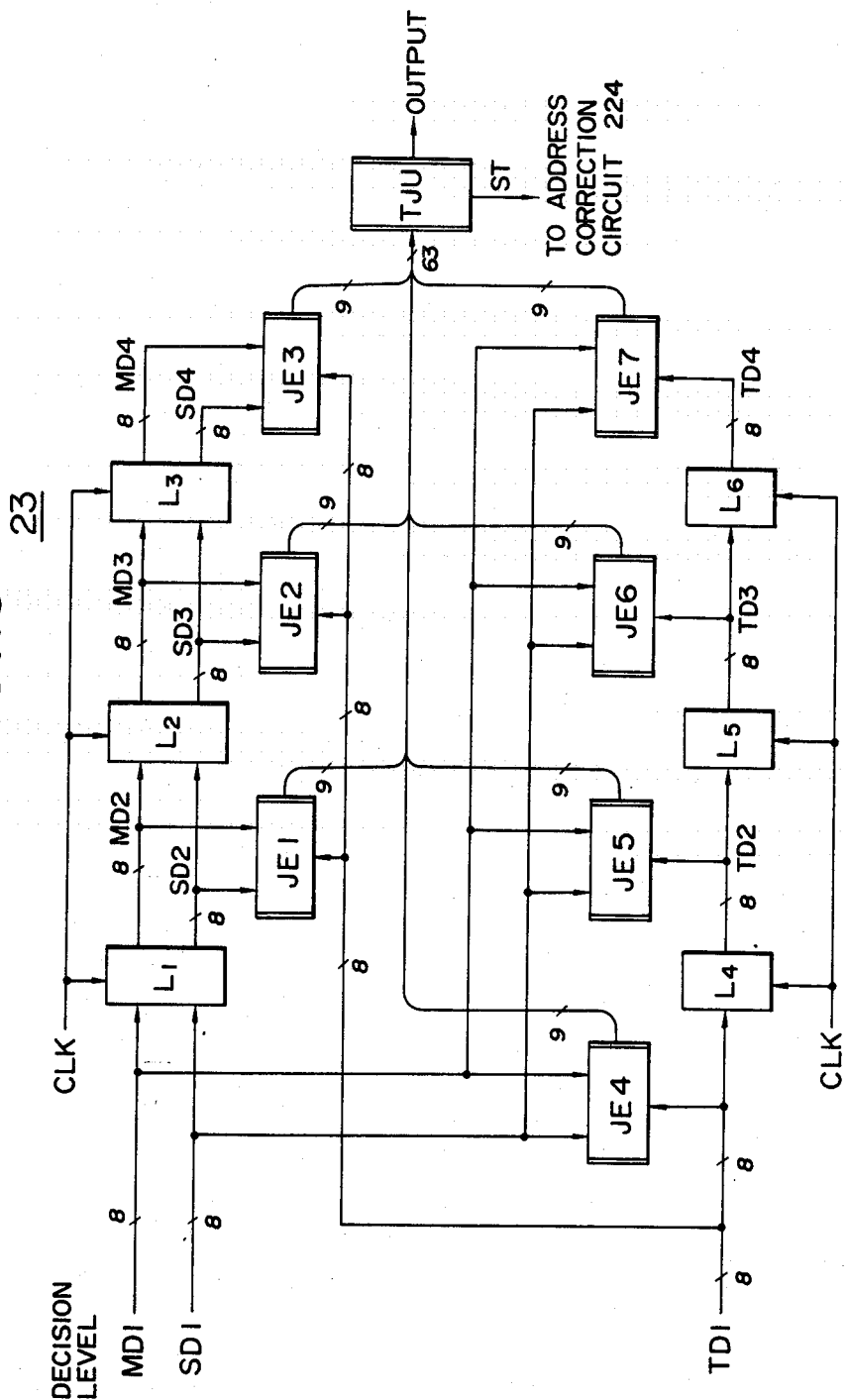
FIG. 18 is a block diagram of a decision circuit as shown in FIG. 17.

In FIG. 18 is shown in detail the construction of the decision circuit 223 when the shift is ±3 picture elements and one line consists of 512 picture elements. The decision circuit 223 consists of a shift circuit consisting of latches $L_1$–$L_3$ for shifting by one picture element the reference row datum SD and the decision level datum MD and another shift circuit consisting of latches $L_4$–$L_6$ for shifting by one picture element the sample row datum TD. These shift circuits are combined with decision elements $JE_1$–$JE_7$.

In response to the clock CLK, which is also used in the case of the scanning by the camera 2 (See FIG. 1), applied to the latches, the shift operations are accomplished. To this end, one clock CLK is derived for every one picture element.

For instance, the sample row datum TD1 is shifted by the latches $L_4$, $L_5$ and $L_6$ in synchronism with the camera scanning, whereby TD2, TD3 and TD4 are derived. In like manner, in synchronism with the camera scanning, the reference row datum SD1 and the decision level datum MD1 are shifted by the latches $L_1$, $L_2$ and $L_3$ so that the MD2, MD3 and MD4 and SD2, SD3 and SD4 are derived.

The sample row datum TD1 is applied to the decision elements JE1, JE2, JE3 and JE4 and is compared with the reference row datum and the decision level datum. That is, the decision element JE4 compares the sample row datum TD1 with the reference row datum SD1 and the decision level datum MD1; the decision element JE1 compares TD1 with SD2 and MD2; the decision element JE2 compares TD1 with SD3 and MD3; and the decision element JE3 compares TD1 with SD4 and MD4. Therefore the decision is made when the reference row datum and the decision level datum are delayed with respect to the sample row datum.

On the other hand, when the sample row datum is delayed with respect to the reference row datum and the picture element control datum, the decisions are made by the decision elements JE5, JE6 and JE7. Thus the decision elements JE1–JE7 compare the sample row datum 9 with the reference row data 10–16 (See FIG. 4a). In this case the outputs from the decision elements JE1–JE7 represent the number of defects detected during one scanning by the camera 2.

The outputs from these seven decision elements JE1–JE7 are applied to an overall decision circuit TJU which selects the minium number of defects from the numbers of defects derived from the decision elements JE1–JE7 and compares the selected minimum number of defects with a threshold value, thereby making the decision whether good or bad. That is, the sample row datum and the reference row datum which is most similar in phase to the sample row datum are compared. In response to the result of the calculation by the overall decision circuit TJU, the decision element which gives the minimum number of defects is detected. As a result, it can be detected how many picture elements the sample row datum being inspected is spaced or deviated from the reference row datum. The discrimination datum is applied from the output terminal ST to the address correction circuit 224 so that the first address of the next camera scanning is determined.

Figures 19, 21:
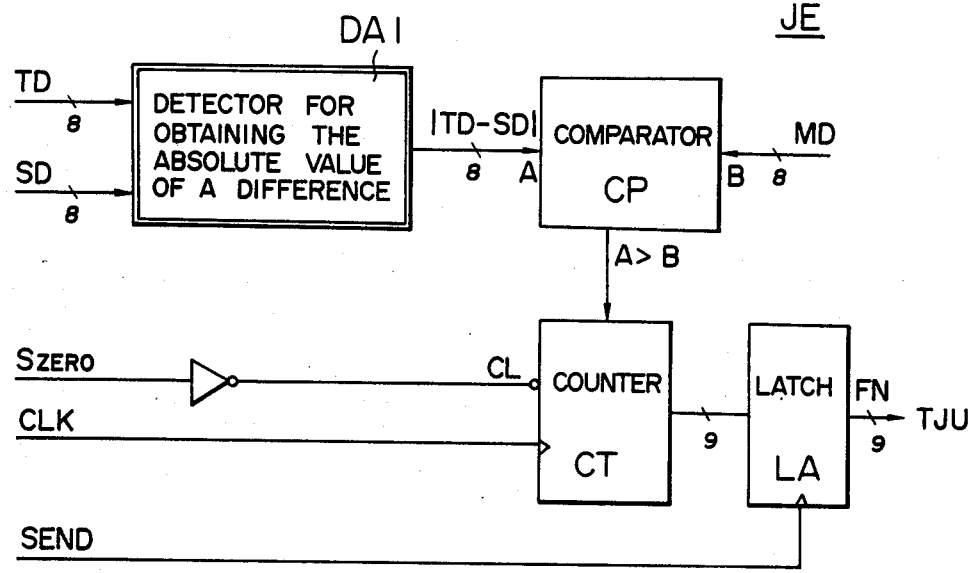
FIG. 19 is a block diagram of a decision element used in the decision circuit as shown in FIG. 18.
FIG. 21 shows a table used to explain the function of an overall decision circuit used in the decision circuit as shown in FIG. 18.

In FIG. 19 is shown in detail the construction of a decision element JE used in the decision circuit as shown in FIG. 18. The decision element JE comprises a detector DA for detecting the absolute value of a difference, a comparator CP, a counter CT and a latching circuit LA. The detector DA is substantially similar in construction to that as shown in FIG. 8. That is, the detector DA obtains the absolute value of the difference $|TD-SD|$ between the sample row datum $TD(TD_1-TD_4)$ and the reference row datum $SD(SD_1-SD_4)$ The comparator CP compares $|TD-SD|$ with the decision level $MD(MD_1-MD_4)$ derived from the decision level setting circuit 227. A picture element in excess of a decision level is applied as a defect signal to the counter CT. The counter CT is reset everytime when the scanning start signal SZERO is produced when one scanning by the camera 2 is started. Therefore the counter CP counts only when the defect signals are produced. The clock CLK applied to the counter CT is the clock which is used to attain the timing in the inspection device in accordance with the present invention. One clock corresponds to one picture element being scanned. That is, the counter CP counts the number of defective picture elements detected during one scanning time period by the camera 2. The latch LA responds to the scanning end signal SEND produced every time when one scanning is accomplished and delivers to the overall decision circuit TJU the number of defective picture elements detected during one scanning time period as a signal FN (FN1–FN7).

In FIG. 20 is shown in detail the construction of the overall decision circuit TJU comprising six low- or minimum-value detectors MIN1–MIN6, a comparator CP and a decision element descrimination circuit JA.

The low-value or minimum-value detectors MIN-1–MIN6, which are constructed as shown in FIG. 10, detect the minimum defect number from the defect numbers FN1–FN7 derived from the decision elements (FIGS. 18, 19 and 8). The comparator CP compares the thus detected minimum defect number with a given defect tolerance number. The row which has defects in excess of a predetermined defect tolerance number is detected as a defective row and the detection signal is derived from the output terminal OUTPUT. A predetermined defect tolerance number consists of a maximum number of defects below which the quantity of a print is judged acceptable, plus a predetermined marginal number which is added in order to prevent the misjudgement due to noise or the like.

The overall decision circuit TJU includes the decision element discrimination circuit JA in order to detect which sample row datum is most similar in phase (has a minimum number of defects) to reference row data. The output ST from the discrimination circuit JA therefore represents how many picture elements the point being scanned is deviated from the reference row datum applied to the inspection device.

The mode of operation of the decision element discrimination circuit as shown in FIG. 20 will be described with reference to FIG. 21. In FIG. 21, "1" represents that the output J from a low- or minimum-value detector satisfies the condition that A>B; "φ" represents that the condition A<B is satisfied; and "X" represents that A may be greater or smaller than B. When J1–J6 satisfy the conditions as shown in the chart, one of the outputs FN1-FN7 from the seven decision elements which has a minimum value can be detected.

Figure 22:
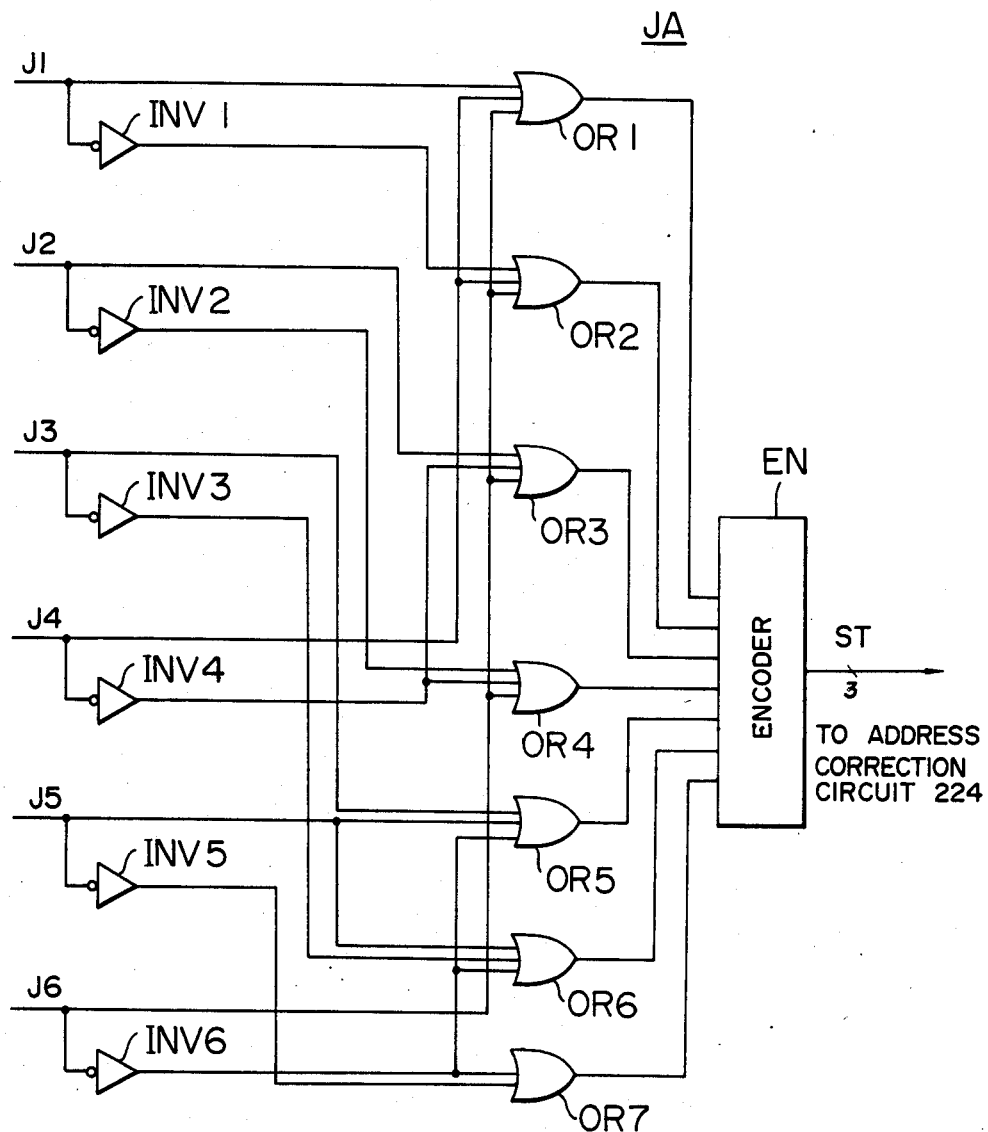
FIG. 22 is a block diagram of a decision element.

In FIG. 22 is shown in detail the construction of the decision element discrimination circuit JA comprising inverters INV1-INV6, OR gates OR1-OR6 and an encoder EN.

The method for setting a decision level (See Japanese Patent Application No. 179,599/1981 filed by the same applicant) has been further improved so that the decision circuit makes a decision in a real time and makes no wrong decision at all.

According to the present invention, three decision levels are used. The first decision level is called "a fixed level" and assigned with a minimum value representing a shadow portion (the lowest density portion) of an image or with a maximum value (8 bits, 255) representing a portion (margin) which is not needed to be inspected. The first decision level is stored in the decision level data memory 226. The second decision level is called "a proportional level" and is a value of a datum derived from the reference picture element data memory 225 which is multiplied by K (K<1). The second decision level serves to improve the inspection.

The third decision level is called "edge level" and represents the difference between the adjacent picture elements in the reference picture element data memory 225. It serves to prevent erratic operations when the density changes rapidly. The second and third decision levels are calculated in real time from data derived from the reference picture element data memory 225.

When a picture element is assigned with a decision level, of the above-described three decision levels, the maximum level is assigned, whereby the erratic detection can be avoided. That is, when the differences in level between picture elements in the reference picture element datum SD are small, the first decision level is used. When the differences in level between the picture elements are high due to gradation, the second decision level is used. When the differences in level between the picture elements are remarkably high because of an edge portion, the third decision level is used. Thus, misjudgement can be avoided.

Figure 23:
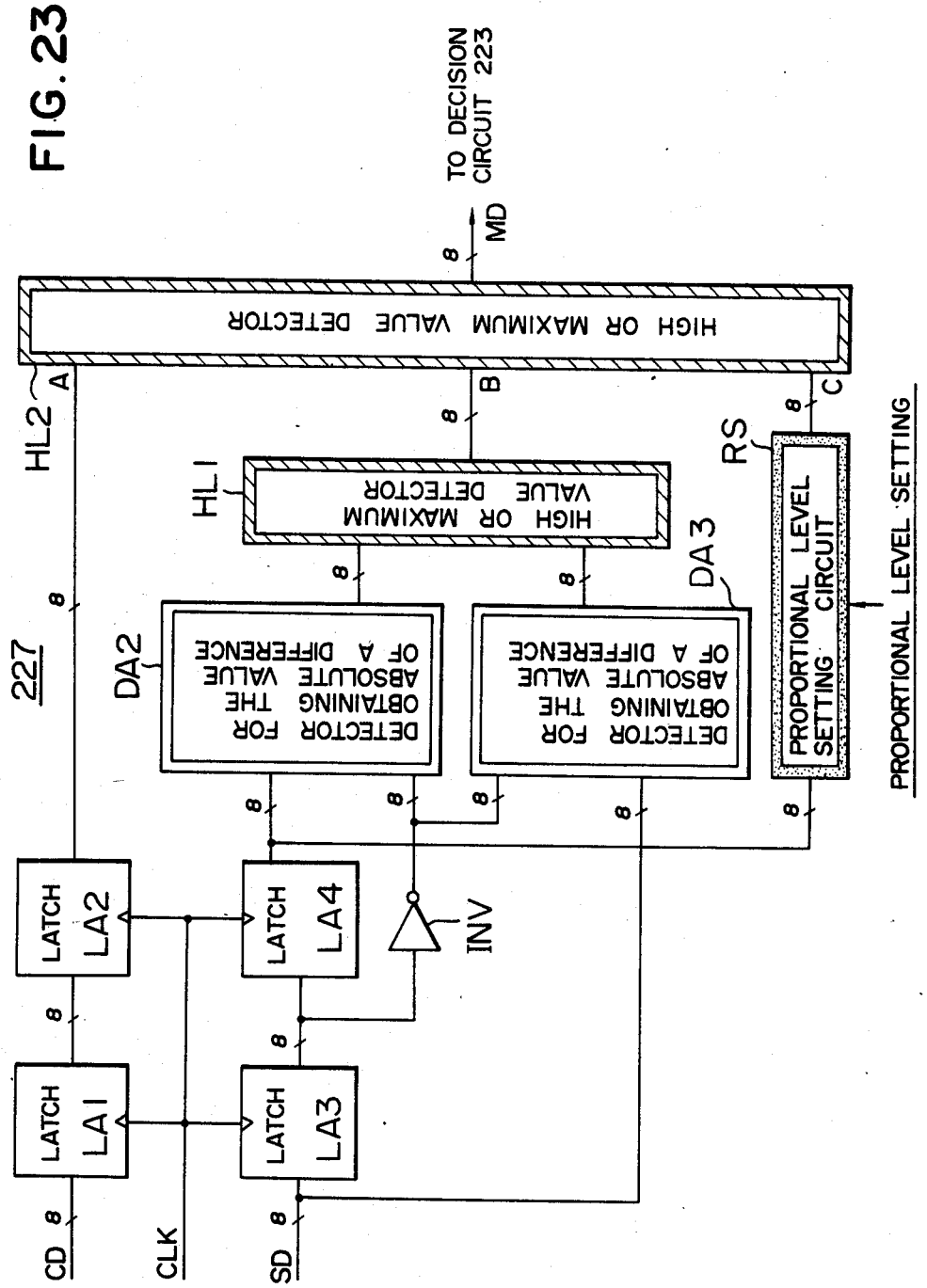
FIG. 23 is a block diagram of a decision level setting circuit used in the third embodiment as shown in FIG. 17.

In FIG. 23 is shown in detail the construction of the decision level setting circuit 227.

In the case of the reference picture element datum SD, the difference between the adjacent picture elements can be obtained by means of latching circuits LA3 and LA4, an inverter INV and detectors DA2 and DA3 each for obtaining or determining the absolute value of a difference. The higher one of the adjacent picture elements is applied through a high-value detector HL1 to the B input terminal of a high-value detector HL2 as a level for determining "the edge level". Therefore, when one picture element is compared with the right or left picture element, one decision level may be assigned even when the position of a picture element is deviated to the right or left. The reference picture element datum SD is multiplied with K (K<1) by a proportional level setting circuit RS and applied to the input terminal C of the high-value detector HLC2 as a level for determining a proportional level.

The reference picture element datum SD is derived as the ouput from the latching circuit LA4 so that "the edge level" may coincide in phase with a picture element. In like manner, in order to derive "the fixed level" from the decision level datum CD, latching circuits LA1 and LA2 are used to coincide phases and the output from the latch LA2 is applied to the input terminal A of the high-value detector HL2. The high-value detector HL2 detects the highest level of the inputs A, B and C; that is, an optimum level obtained from the difference in level between the picture elements in the region of the reference picture element datum SD. The highest or optimum level is applied to the decision circuit 227 as a decision level MD of that picture element.

The above operation is carried out in synchronism with the timing clock CLK of the inspection device so that the decision level is applied in real time to the decision circuit which compares the picture elements of the sample row datum with those of the reference row datum.

The detectors DA2 and DA3 are substantially similar in construction to that as shown in FIG. 8. The high-value detectors HL1 and HL2 have the function opposite to the function of the low-value priority circuit MIN so that the circuit diagram of the high-value detector HL1 or HL2 is now shown in the drawing.

Figure 24:
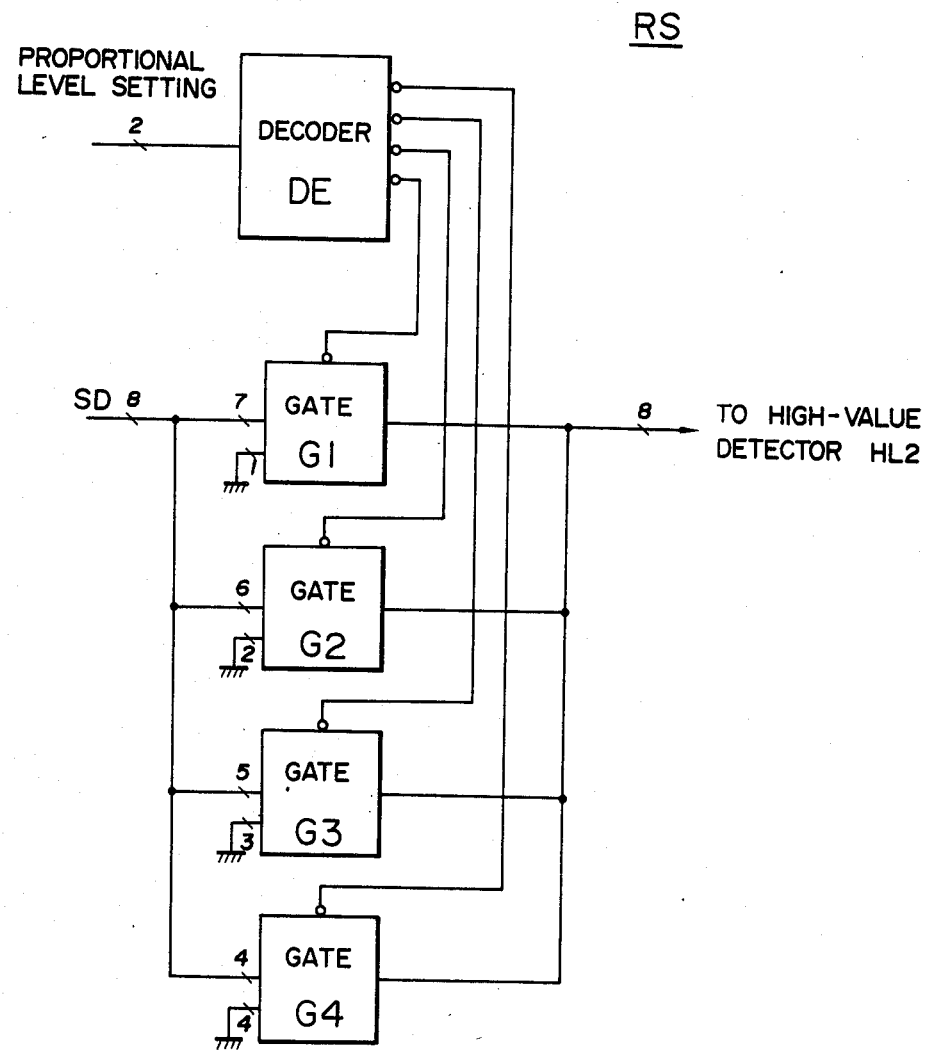
FIG. 24 is a block diagram of a proportional level setting circuit used in the decision level setting circuit as shown in FIG. 23.

In FIG. 24 is shown in detail the construction of the proportional level setting circuit RS. According to the present invention, in order to simplify the construction, no multiplier is used. Instead, a decoder DE is used to select gates G1-G4 so that a specific decision level may be obtained. Furthermore, the proportional level setting value consists of two bits. Of the inputs to the gate G1, the most significant bit is connected to LOW while the lower seven bits are connected to the upper seven bits of the reference picture element datum SD (the remaining one bit being not connected). Therefore, when the gate G1 is selected, 50% of the reference picture element datum SD is derived. In like manner, when G2 is selected, 25% of the reference picture element data SD is derived; when G3 is selected, 12.5% of the reference picture element data SD is derived; and when G4 is selected, 6.25% of the reference picture element datum SD is derived.

Figure 25:
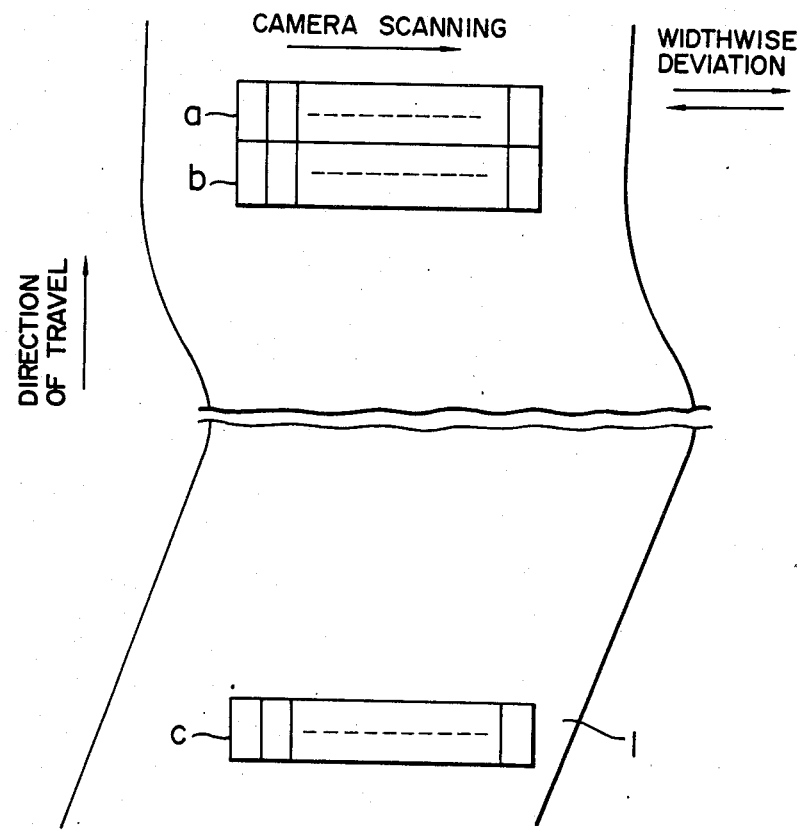
FIG. 25 is a view used to explain the widthwise deviation of a printed image when transported.

In the case of the print transport system of a reversing inspection device, an image is deviated widthwise as shown in FIG. 25. Furthermore, in the printing step, a web is shifted widthwise so that an impression cylinder is shifted widthwise. In this case, the sample row data are greatly shifted widthwise. As a result, it is expected that the scanning position c is considerably shifted with respect to the scanning position a when the interval between the scanning of row a and the scanning of row c is long. But when the scanning interval is just one scanning time as shown at a and b, the row b is not shifted at all with respect to the row a (even though there might be a deviation or misalignment of one or two picture element between them). It follows therefore that some countermeasure must be taken when one row (scanning line) is spaced apart from another row (scanning line) by a great distance. If many reference row data are prepared for the sake of such countermeasure, the load imposed on the hardware will become too great.

Therefore, according to the present invention, when the scanning lines are spaced apart from each other by a small distance (for instance, in the case of the scanning lines a and b in FIG. 25), a few reference row data (±3 picture elements in this embodiment) are used while the scanning lines are spaced apart by a greater distance (for instance, between the scanning lines a and c), the address at which the scanning is started is so shifted that the misalignment between the scanning lines may be reduced to a minimum. Thus, the load imposed on the hardware may be considerably decreased. This will be described in detail with reference to FIG. 26. The address correction is made based upon the point at which the scanning is started and the point at which the scanning is terminated. To this end, the angle of rotation of the cylinder 3 is divided based on the signal derived from the rotary encoder 4. The points at which the scanning is started are designated by N1 and N2 while the points at which the scanning is terminated are designated by ED1 and ED2. Every time when the scanning is started from the point N1 or N2, the scanning start signal SZERO is generated and every time when the scanning is terminated at the point ED1 or ED2, the scanning end signal SEND is generated.

Between the scanning end point SEND and the scanning start point SZERO, the camera accumulates light and the inspection device is disabled or does not perform any calculation. During this period, in response to the ST signal derived from the decision circuit 223 (which gives the address of the reference row datum which is most similar in phase to the sample row datum), the next address at which the next scanning is started is corrected so that the positional deviation can be corrected in real time.

FIG. 27 explains the definition of the positional deviation of the ST signal derived from the decision circuit 223. G1 represents the positions of picture elements when the reference row datum is received. G2 and G3 are curves obtained by shifting the curve G1 in order to make the reference row datum coincide in phase with the sample row data. The curve G2 is called the shift in the negative direction while the curve G2, the shift in the positive direction. That is, according to the present invention, when the three-bit ST signal is decoded, it can be detected that the sample row datum is most closely located with respect to the reference row datum within ±3 picture elements. This may be tabulated as follows:

| ST (MSB) | | | | |
|---|---|---|---|---|
| 3 | 2 | 1 | shift | remarks |
| X | $\phi$ | $\phi$ | no shift | sample row and reference row are in phase. |
| $\phi$ | $\phi$ | 1 | + one picture element | sample row is in phase with the reference row G1 which is shifted by one picture element in the positive direction |
| $\phi$ | 1 | $\phi$ | + two picture elements | sample row is in phase with the reference row G1 which is shifted by two picture elements in the positive direction |
| $\phi$ | 1 | 1 | + three picture elements | sample row is in phase with the reference row G1 which is shifted by three picture elements in the positive direction |
| 1 | $\phi$ | 1 | − one picture element | sample row is in phase with the reference row G1 which is shifted by one picture element in the negative direction |
| 1 | 1 | $\phi$ | − two picture elements | sample row is in phase with the reference row G1 which is shifted by two picture elements in the negative direction |
| 1 | 1 | 1 | − three picture elements | sample row is in phase with the reference row G1 which is shifted by three picture elements in the negative direction |

Figure 28:
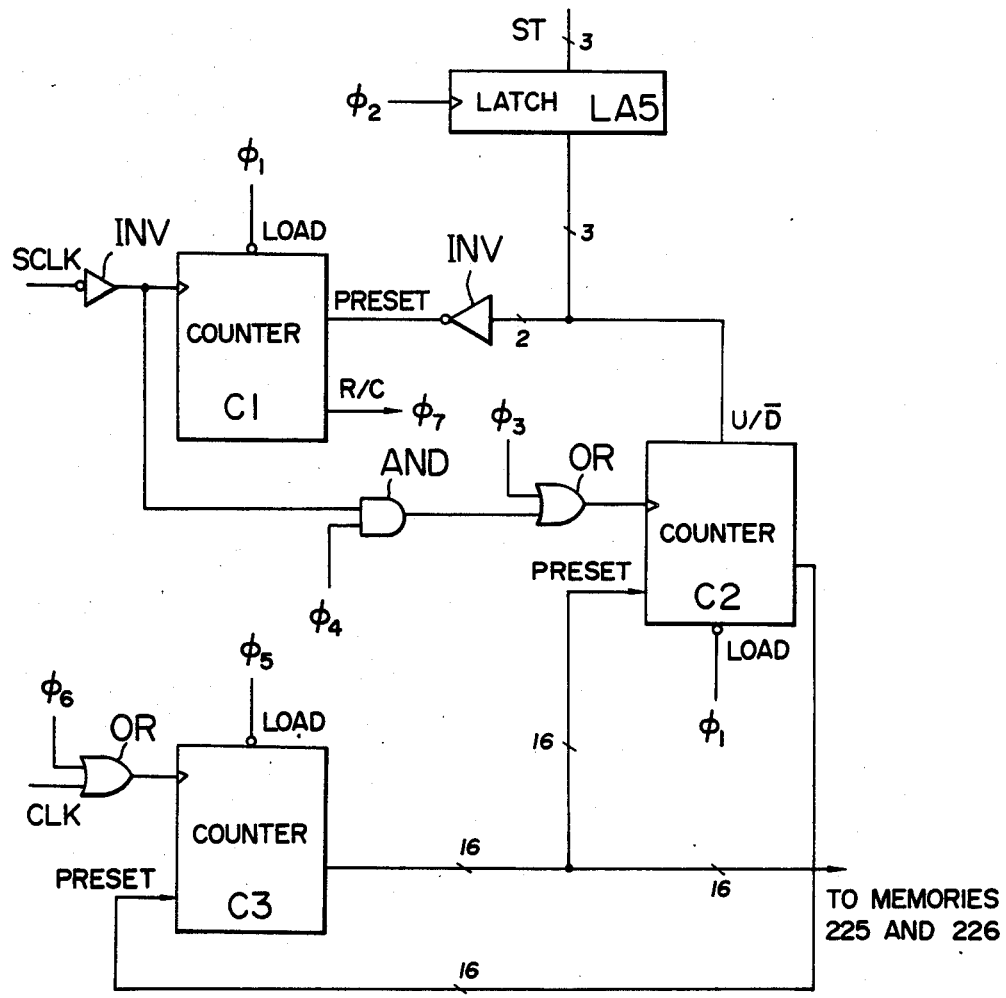
FIG. 28 is a block diagram of an address correction circuit of the third embodiment as shown in FIG. 17.

In FIG. 28 is shown in detail the construction of the address correction circuit 224 comprising three counters C1–C3, a latching circuit LA5, an inverter INV, an AND gate AND and OR gates OR. The signal SCLK is derived from the camera and in response to one clock, one picture element information is applied to the inspection device. Within the inspection device in response to the signal SCLK, the signal CLK for controlling the interior circuit components is generated. The signal SCLK is generated by the camera so that it is generated even when no address is generated; that is, during the time when SEND is generated to the time when SZERO is generated. However, the signal CLK is generated within the inspection device so that it is not produced between the time when the signal SZERO is produced and the time when the signal SEND is generated. It follows therefore that only the signal SCLK can be used as a timing signal for address correction.

Figure 29:
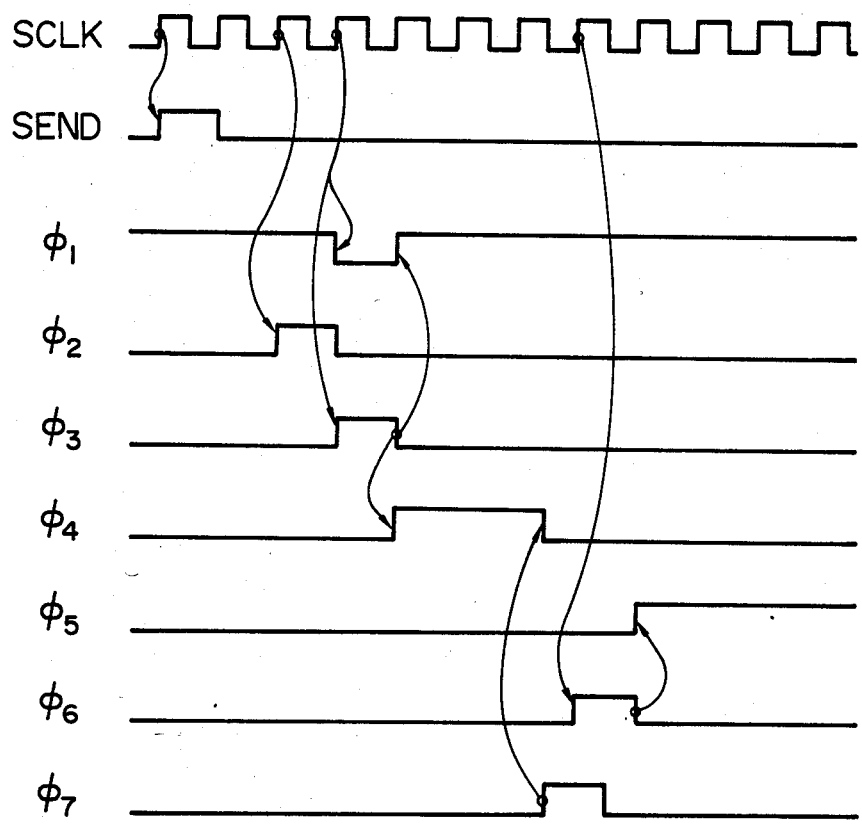
FIG. 29 shows a timing chart used to explain the mode of operation of the circuit as shown in FIG. 28.

FIG. 29 shows a timing chart of clock pulses $\phi_1$–$\phi_7$. The correct address correction may be accomplished between the time when signal SEND is produced and the time when the signal SZERO is generated.

Each of the counters C1–C3 is provided with a preset function. When the load terminal goes LOW, the preset data is derived. C1 is preset with the signal ST derived from the decision circuit 223 and counts the number of picture elements which are deviated. C2 is an up/down counter and is preset with the address at which the preceding scanning has terminated. C2 presets the internal address generating counter C with the address which is obtained by counting up or down the signal SCLK as the address which is most similar in phase with the present sample row datum. In response to the preset data from C2, C3 produces an internal address which is an optimumly corrected scanning start address. The internal address consists of 16 bits. The output is used as an address for writing data into a memory or reading data therefrom.

Referring back to FIG. 29, the functions of the clock pulses $\phi_1$–$\phi_7$ will be described. In synchronism with the SEND SIGNAL from the decision circuit 223, the signal ST is produced. Within a time period in which this data is settled, the data is stored into the latch LA5. The most significant bit of the output from the latch LA5 is applied to the up/down counter C2 as a signal representing the direction in which the sample row datum is shifted. After the counter C2 has been driven into the counting up state or the counting down state, in response to the clock pulse $\phi_3$, the counter C2 delivers the preset data (that is, the address at which the preceding scanning has terminated). However, while the clock $\phi_1$ is LOW (preset mode), no counting is carried out. The lower two bits of the output from the latching circuit LA5 are applied through the inverter INV as the preset data to the counter C1 which counts the number of picture elements which are deviated in position. The counter C1 counts how many picture elements in which the sample row datum deviates from the reference row datum and delivers the clock pulse $\phi_7$. In response to $\phi_7$, the signal $\phi_4$ is produced and the signal SCLK which corresponds to the number of picture elements deviated is applied to the clock input of the up/down counter C7. Therefore, the counter C2 shifts the internal address in response to the deviation so that the scanning start address may be corrected in such a way that the scanning start address is as closely in phase with the present camera scanning as possible. The clocks $\phi_5$ and $\phi_6$ are used to replace the corrected address with the internal address.

Figure 30:
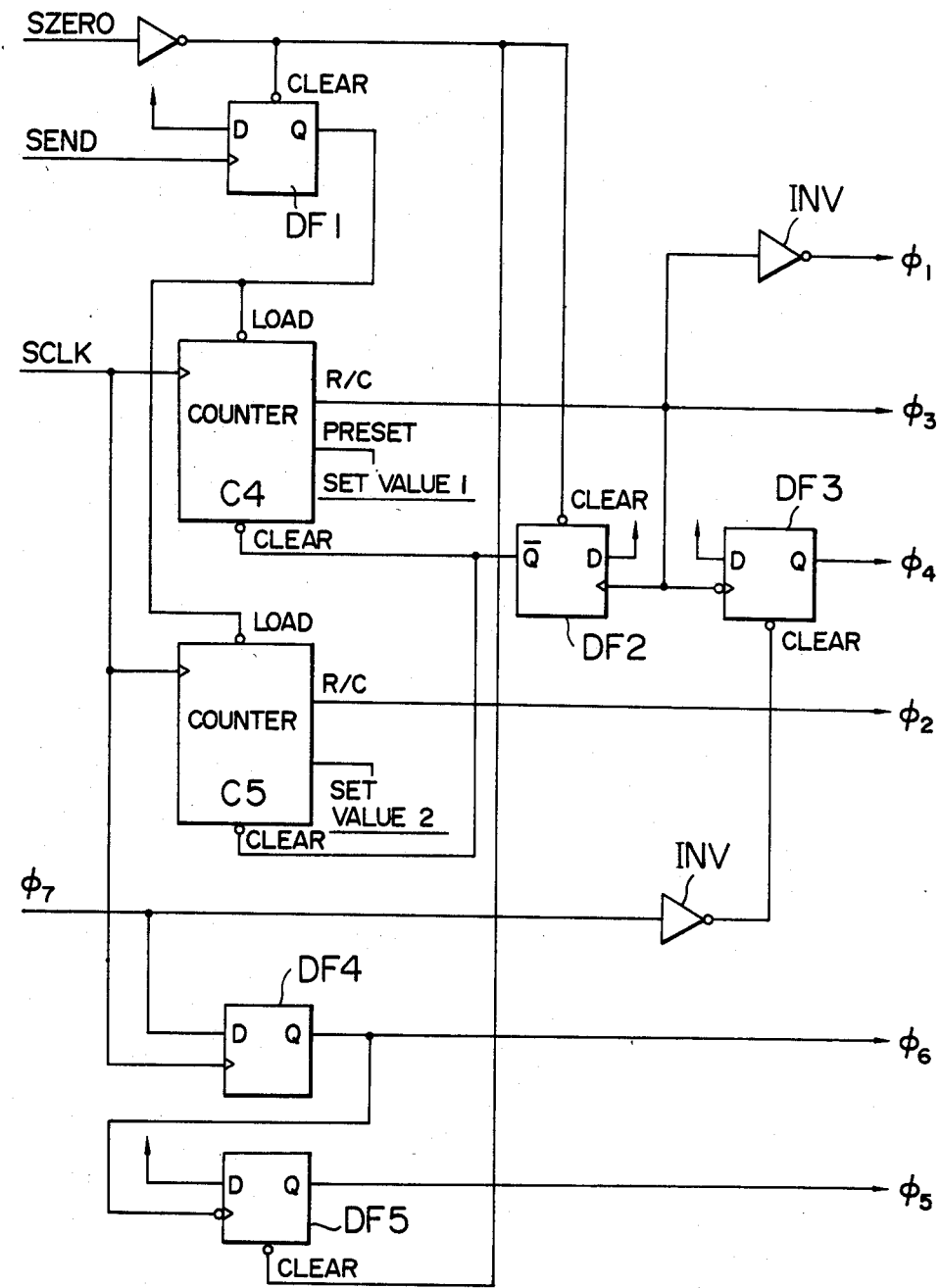
FIG. 30 is a block diagram of a clock generator used in the circuit as shown in FIG. 28.

In FIG. 30 is shown in detail the construction of a clock generator which is adapted to generate the clocks $\phi_1$–$\phi_6$ as shown in FIG. 29. The clock generator comprises D flip-flops DF1–DF5, counters C4 and C5 and inverters INV.

From the time when the signal SEND is produced to the time when the signal SZERO is produced, the flip-flop DF1 drives the counters C4 and C5 into the count mode so that the clocks $\phi_2$ and $\phi_3$ are produced. The clock $\phi_3$ is applied to the flip-flops DF2 and DF3 so that the clock $\phi_1$ is produced. The clock $\phi_1$ is obtained by inverting the clock $\phi_3$ by the inverter INV. The output $\phi_7$ from the counter C1 is applied to the flip-flop DF4 and DF5, whereby clocks $\phi_5$ and $\phi_6$ are derived.

Therefore, even when a printed image is deviated, whether the printed image is acceptable or not can be correctly determined at high speed and less cost. Furthermore, the reference row data are compared with the sample row data so that the inspection can be made with a higher degree of accuracy as compared with the case in which the whole reference and sample images are compared with each other.

Moreover, the deviation in the direction of the transport of the printed image can be compensated for by the circuit as shown in FIG. 11 which is a modification of the decision circuit as shown in FIG. 18. The circuit comprises decision elements JC1–JC7, shift registers SR1–SR6 and an overall decision circuit TJU. Each of the shift registers has the bits equal in number to those of the sensor array of the camera 2 (see FIG. 1). As shown in FIG. 18, the reference row datum SD, decision level MD and the sample row datum TD are delayed by one picture element and applied to the decision elements JC1–JC7. The outputs from the decision elements JC1–JC7 are applied to the overall decision circuit TJU, whereby a minimum number or value is detected.

Figure 31:
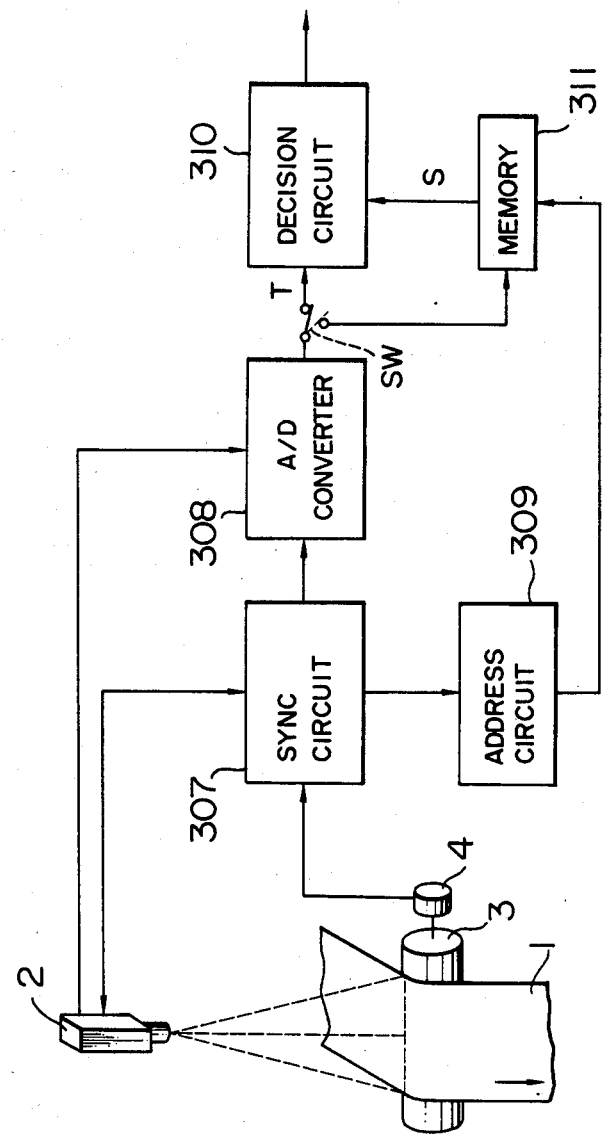
FIG. 31 is a block diagram of a fourth embodiment of an image inspection device in accordance with the present invention.

In FIG. 31 is shown a fourth embodiment of the printed image inspection device in accordance with the present invention. In the case of the inspection of a printed image, some allowance or tolerance must be provided so that a normal printed sheet may not be misjudged as spoilage. The reasons are as follows. Firstly, even a normal printed sheet has some variations in density. Secondly, the same images are not printed at the same position in a strict sense. Thirdly, noise cannot be avoided. Therefore, some suitable tolerance must be provided for the reflected-light gradation difference between the sample and reference images or picture elements.

Tolerances vary depending upon images or their picture elements For instance, a large degree of tolerance must be provided for a picture element adjacent to an edge of an image because the gradation difference becomes great due to the deviation caused by a printed image transport system. (see Japanese Patent Application No. 179,599/1981). Furthermore, the gradation difference due to the deviation is small at a flat portion of an image so that some tolerance must be provided in such a way that a normal printed image is misjudged as a spoilage because of variations and noise. Therefore a tolerable number of defects is determined for the total number of defective picture elements in excess of the above-described tolerance. If the number of defective picture elements is in excess of the tolerable number of defective picture elements, a printed image is rejected, but if the number of defective picture elements is lower than the tolerable number of defective picture elements, a printed image is accepted. That is, the images are inspected based on the combination of a tolerable or allowable number of defective picture elements and the gradation difference tolerance for each picture element.

Figure 32:
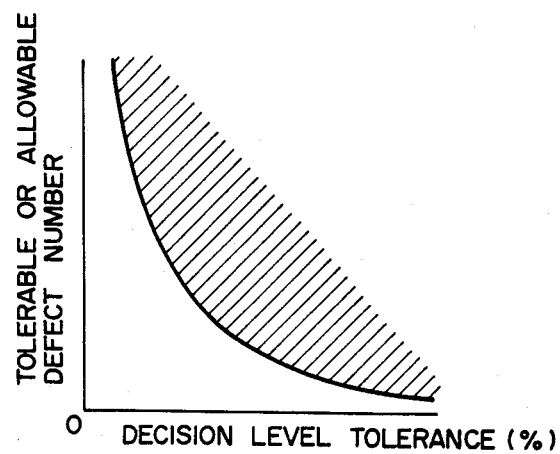
FIG. 32 shows a characteristic curve showing the relationship between the decision level tolerance and a tolerable or allowable number of defective picture elements.

In FIG. 32 is shown the relationship between a tolerable or allowable number of defective picture elements and the gradation difference decision tolerance (%) for each picture element. FIG. 32 shows the following characteristics. In order to detect a spot-like stain which is caused by the scatter of ink and which has a high contrast, the decision level allowance or tolerance must be made great, but the tolerable or allowable number of defective picture elements must be made small. Furthermore, in order to detect delicate tone mismatching between the whole reference and sample prints due to the failures of color matching, the gradation difference tolerance or allowance must be made small while the tolerable or allowable number of defective picture elements must be made high. In FIG. 32, the hatched area shows the area which can be inspected, but the area which is not hatched shows that a normal printed sheet is misjudged as a spoilage. In order to detect an ink stain, therefore, an area at the lower right side of the characteristic curve must be selected. In order to detect the color or tone mismatching, an area at the top left side of the characteristic curve must be selected.

However, according to the prior art printed image inspection devices, only one combination of the gradation difference tolerance and the tolerable or allowable number of defective picture elements is used so that only specified image defects can be detected. That is, the prior art devices cannot detect various image defects. In order to overcome this problem, an additional device for detecting image defects must be provided so that the overall printed image inspection devices become large in size and complex in construction.

According to the embodiment as shown in FIG. 31, the camera 2 scans the printed image 1 so that the image information is derived. In this case, the angle of rotation of the transport cylinder 3 is detected by the rotary encoder 4, the output of which is applied to the sync circuit 307. The outputs from the sync circuit 307 are applied to the camera 2, an A/D converter 308 and an address circuit 309. Therefore, the scanning by the camera 2 can be synchronized; the analog-to-digital conversion of the image information derived from the camera 2 can be synchronized; and an address in an address memory 311 is accessed. A switch SW is inserted between the output of the A/D converter 308 on the one hand and the inputs of the memory 311 and a decision circuit 310 on the other hand. Therefore, the output from the A/D converter 308 may be selectively applied to either the decision circuit 310 or the memory 311. More particularly, when the camera 2 is scanning a reference image 1, the movable contact of the switch SW is in the position indicated by the broken line so that the reference image data (to be referred to as "the reference data" in this specification) may be applied to the memory 311, but when the camera 2 is scanning a sample image, the movable contact of the switch SW is in the position indicated by the solid line so that the sample image data (to be referred to as "the sample data" in this specification) may be applied to the decision circuit 310 and compared with the reference data so as to find out image defects. In FIG. 31 T represents sample data while S, reference data.

Figure 33:
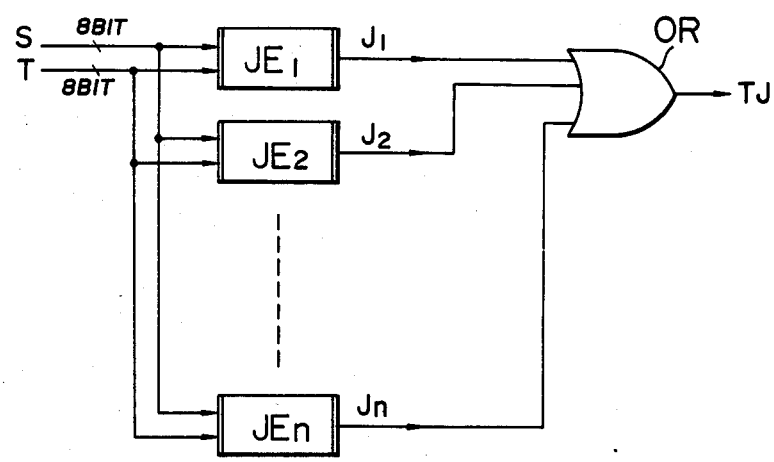
FIG. 33 is a block diagram of a decision circuit used in the fourth embodiment as shown in FIG. 31.

In FIG. 33 is shown in detail the construction of the decision circuit shown in FIG. 31, comprising a number of n decision elements JE1-JEn and an OR gate OR. Both the reference and sample data S and T are applied to the decision elements JE1-JEn the outputs of which are in turn applied to the OR gate OR which in turn delivers the overall decision signal TJ.

Each of the decision elements JE1-JEn is set with a gradation difference tolerance and a tolerable or allowable number of defective picture elements. Different gradation difference tolerances and tolerable or allowable numbers of defective picture elements are assigned to respective decision elements JE1-JEn. For instance the first decision element JE1 is assigned with a relatively high gradation difference tolerance and a relatively low tolerable number of defective picture elements so that the decision element JE1 can detect a spot like stain. On the other hand, the last decision element JEn is assigned with a relatively small gradation tolerance and a relatively high tolerable or allowable number of defective picture elements so that the decision element JEn can detect delicate tone differences between the whole reference and sample images. The decision elements JE2-JEn−1 are assigned with gradation difference tolerances and tolerable or allowable numbers of defective picture elements between the those assigned to the first and last decision elements JE1 and JEn. Therefore the decision elements JE1 and JEn detect extreme image defects while the decision elements JE2-JEn−1 detect intermediate image defects. The output from each of the decision elements JE1-JEn represents a spoilage and is applied to the OR gate so that the output from the OR gate represents the detection of a spoilage.

In FIG. 34 is shown in detail the construction of the decision element shown in FIG. 33. Sample data and reference data T and S are applied to a detector 322 (which is substantially similar in construction to that shown in FIG. 8) so that |S-T| is derived and applied to the input terminal B of a comparator 323. The output E from a tolerance generator 321 is applied to the input terminal A of the comparator 323.

The tolerance E may be generated in various ways. For instance, one tolerance may be assigned to each picture element. According to the present invention, the gradation of a picture element of the reference image is multiplied by a predetermined constant (0-1) and the product is a tolerance to be applied to the picture element of the sample image corresponding to the picture element of the reference image. Thus the tolerance generator 311 generates a gradation tolerance E which is obtained by multiplying reference data by a predetermined constant (0-1).

If the comparator 323 detects that the absolute value |S-T| is greater than the gradation tolerance E (|S-T|>E), it delivers an output to a counter 324. That is, the counter 324 counts the defect signals which in turn represent a number of defective picture elements. The output from the comparator 324 is compared with a tolerable or allowable number of defective picture elements derived from a latching circuit 326 by another comparator 325. When the number of defective picture elements (that is, the output from the counter 324) is greater than the tolerable or allowable number of defective picture elements (that is, the output from the latching circuit 326), the comparator 325 delivers a spoilage signal J.

Figure 35:
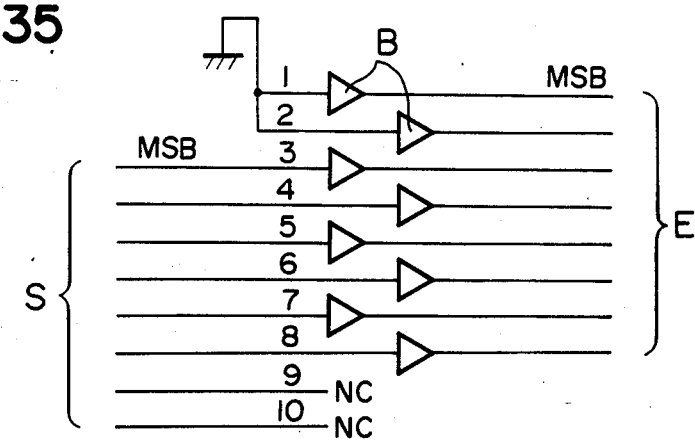
FIG. 35 is a diagram of a circuit for setting a gradation difference used in the circuit as shown in FIG. 34.

In FIG. 35 is shown in detail the construction of the tolerance generator 311 comprising a plurality of buffers B equal in number to the bits of the input signal S. In this embodiment, the reference data comprise 8 bits so that eight buffers B are provided. The inputs of two of the eight buffers B are grounded and the outputs from these two buffers B are designated by MSB. The upper six bits including MSB of the sample data S are derived through the buffers B. The lowest significant bit and the next lowest significant bit of the data S are not connected so that the reference data S is shifted down by two bits and consequently the gradation tolerance E of 12.5% is obtained. In like manner, the reference data S is shifted down so that the gradation tolerance E of 50%, 25%, 6.25% or 3.125% may be obtained. In order to obtain the gradation tolerances other than described above, a multiplier such as TTL may be used.

What is claimed is:

1. A printed image inspection method of the type in which image data derived from a sample print are compared with image data derived from a reference print and stored in a memory means, characterized by:
preparing a plurality of data consisting of sample row data and reference row data by shifting successively either of said sample row data derived from said sample print or said reference row data derived from said reference print by one picture element unit with respect to each other;
successively comparing said sample row data with said reference row data by using said plurality of data to detect a difference in between these two data, one of these two row data consisting of said plurality of data and the other a singular data; and
determining whether or not said sample print is acceptable depending upon whether or not a minimum value of a gradation difference between said sample row data and said reference row data is within a predetermined range of value obtained from said comparison of said sample row data and said reference row data, a value obtained by multiplying said reference row data by a predetermined constant or a difference in level of density at a portion where the density abruptly changes.

2. A printed image inspection method as set forth in claim 1, wherein said sample row data are shifted and said reference row data are not shifted.

3. A printed image inspection method as set forth in claim 1, wherein said reference row data are shifted and said sample row data are not shifted.

4. A printed image inspection method of the type in which image data derived from a sample print are compared with image data derived from a reference print and stored in a memory means, characterized by:
preparing a plurality of data consisting of sample row data and reference row data, one of these data consists of successively shifted data, by successively shifting either of said sample row data derived from a sample print or said reference row data derived from said reference print by one picture element unit with respect to each other;
successively comparing said sample row data with said reference row data by using said plurality of data to detect a difference in level between these two data, one of these two row data consisting of said plurality of data and the other a singular data;
determining whether or not said sample print is acceptable depending upon whether or not a minimum value of a gradation difference between said sample row data and said reference row data is within a predetermined range of a value obtained through said comparison of said sample row data and said reference row data, a value obtained by multiplying said reference row data by a predetermined constant or a value of a difference in level of density at a portion where the density abruptly changes;

obtaining the deviation between said sample row data and said reference row data in response to the positional relationship between said sample row data and said reference row data when said difference in level becomes minimum; and correcting the address of either of said sample row data or said reference row data according to said variation.

5. A printed image inspection method as set forth in claim 4, wherein said sample row data are shifted and said reference row data are not shifted.

6. A printed image inspection method as set forth in claim 4, wherein said reference row data are shifted and said sample row data are not shifted.

* * * * *